(12) United States Patent
Smith et al.

(10) Patent No.: US 10,520,009 B2
(45) Date of Patent: Dec. 31, 2019

(54) CONSUMER PRODUCT SUCTION CUP ENSEMBLE

(71) Applicant: NFR Investments Pty. Ltd., Thornleigh, NSW (AU)

(72) Inventors: George D. Smith, Plainfield, IL (US); Wilson Liao, Shenzen (CN); Chiu Kit Ng, Shenzen (CN)

(73) Assignee: NFR Investments Pty. Ltd., Thornleigh, NSW (AU)

( * ) Notice: Subject to any disclaimer, the term of this patent is extended or adjusted under 35 U.S.C. 154(b) by 0 days.

(21) Appl. No.: 16/117,201

(22) Filed: Aug. 30, 2018

(65) Prior Publication Data

US 2019/0249709 A1    Aug. 15, 2019

Related U.S. Application Data

(60) Provisional application No. 62/630,115, filed on Feb. 13, 2018.

(51) Int. Cl.
| | |
|---|---|
| *A45D 42/14* | (2006.01) |
| *F16B 47/00* | (2006.01) |
| *F16M 13/00* | (2006.01) |
| *A63H 3/36* | (2006.01) |

(52) U.S. Cl.
CPC ........... *F16B 47/00* (2013.01); *F16M 13/005* (2013.01); *A63H 3/36* (2013.01)

(58) Field of Classification Search
CPC .......... B60J 3/02; B29C 73/025; F16B 47/00; Y10T 428/20; Y10T 428/15
See application file for complete search history.

(56) References Cited

U.S. PATENT DOCUMENTS

| | | | |
|---|---|---|---|
| 1,871,113 A | 8/1932 | Comptor et al. | |
| 2,319,727 A | 5/1943 | Duggan | |
| 4,196,882 A | 4/1980 | Rognon | |
| 5,263,760 A * | 11/1993 | Sohol | B60J 3/02 248/205.9 |
| 5,381,990 A | 1/1995 | Belokin et al. | |
| 5,511,752 A * | 4/1996 | Trethewey | B25B 11/007 248/205.8 |
| 5,711,501 A | 1/1998 | Belokin et al. | |
| 5,996,806 A | 12/1999 | Adams | |
| 6,213,521 B1 | 4/2001 | Land et al. | |

(Continued)

*Primary Examiner* — Amy J. Sterling
(74) *Attorney, Agent, or Firm* — Christopher J. Scott

(57) ABSTRACT

A consumer product or toy suction cup ensemble includes a housing, a suction cup formation, and a relief valve formation. A collar element may be included in certain embodiments. The housing includes a stem-letting aperture. The suction cup formation includes a collapsible cup portion and a stem portion. The stem portion includes a valve-letting passage. The stem-letting aperture receives the stem section. The relief valve formation includes a valve stem and a valve upper portion. The valve stem includes opposed valve stem grooves that extend from a valve stem end and have a groove length lesser than the valve stem thereby forming a valve-sealing portion. The valve stem is receivable in the valve-letting passage. The collar element of certain embodiments includes an outer collar periphery and an inner slot portion. The inner slot portion accepts the collar-receiving stem section and the outer collar periphery is wider than stem-letting aperture.

20 Claims, 31 Drawing Sheets

(56) References Cited

U.S. PATENT DOCUMENTS

| | | | |
|---|---|---|---|
| 6,474,096 B1* | 11/2002 | de la Guardia | A47G 19/2288 62/457.3 |
| 9,746,022 B2* | 8/2017 | Shi | F16B 47/00 |
| 2017/0275104 A1 | 9/2017 | Tell | |

* cited by examiner

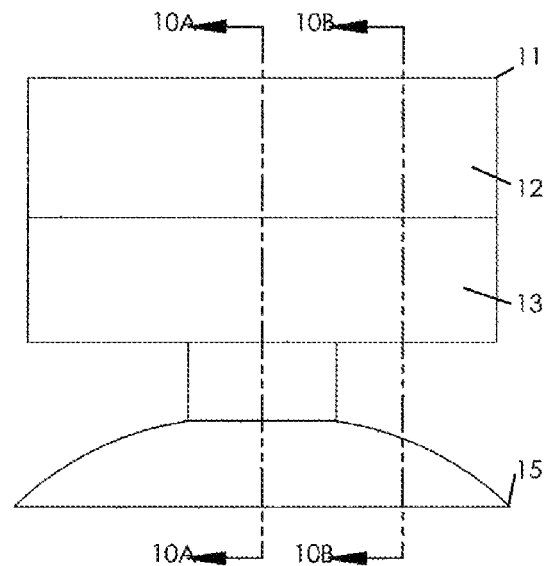
FIG.10
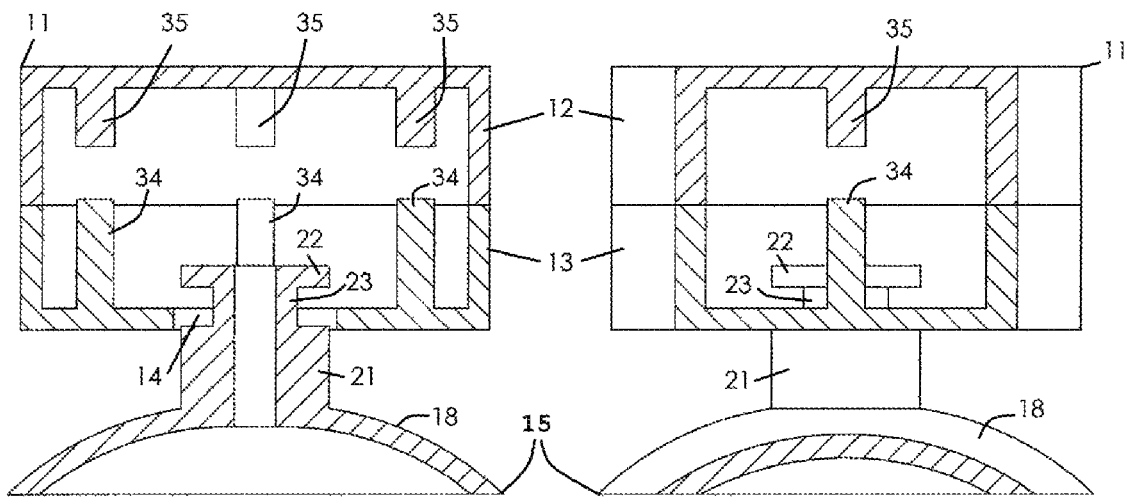
FIG.10A                    FIG.10B

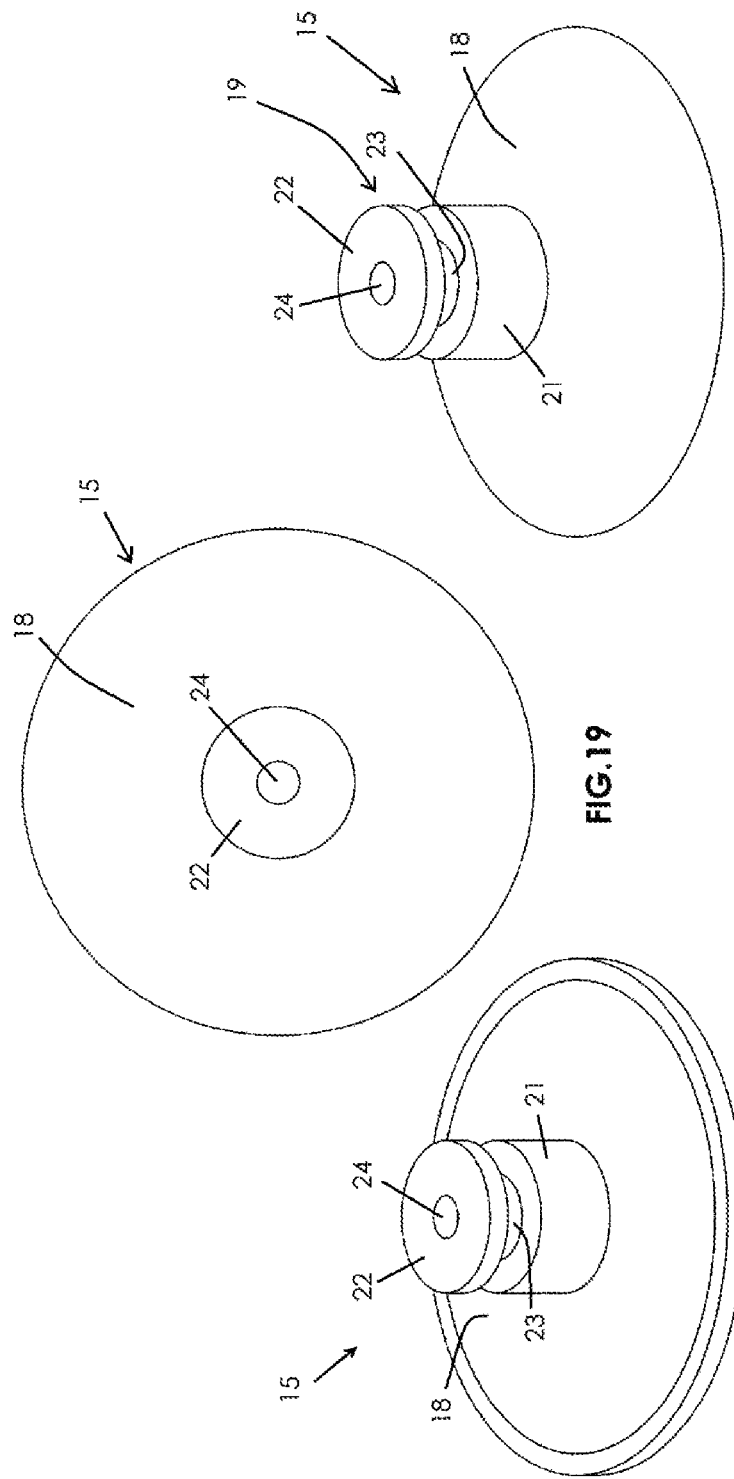

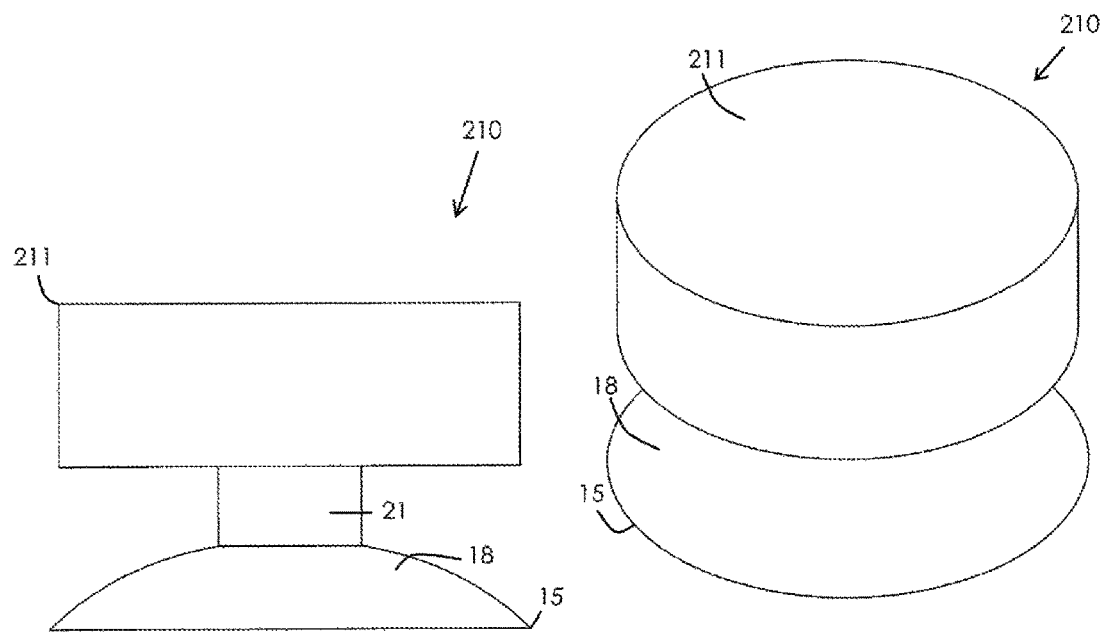
FIG.61
FIG.62
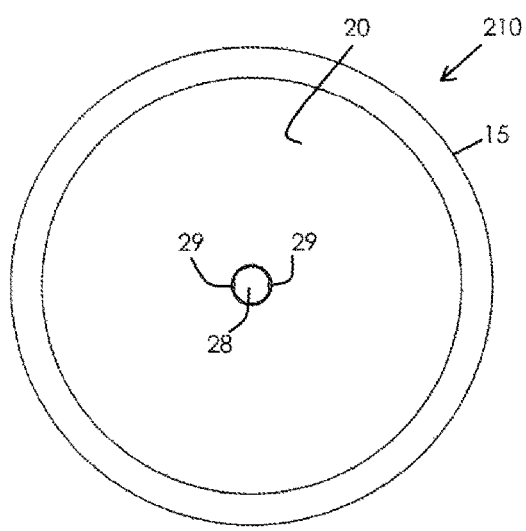
FIG.63
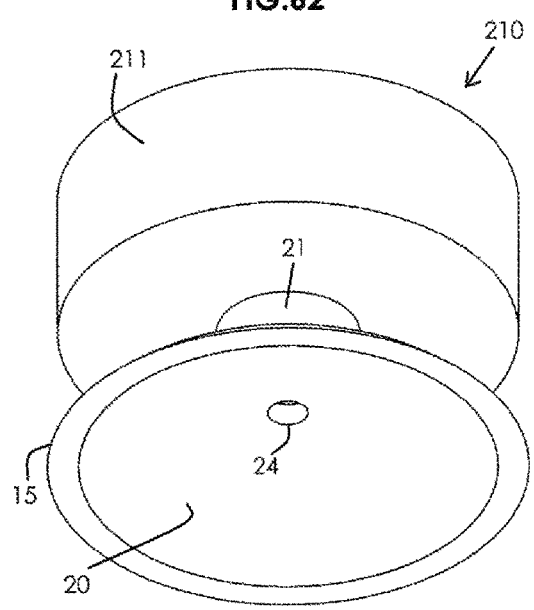
FIG.64

CONSUMER PRODUCT SUCTION CUP ENSEMBLE

PRIOR HISTORY

This application claims the benefit of US Provisional Patent Application No. 62/630,115 filed in the United States Patent and Trademark Office on 13 Feb. 2018.

FIELD OF THE INVENTION

The present invention generally relates to a consumer product or toy incorporating or providing a suction cup ensemble, and more particularly, to a suction cup ensemble usable in combination with a consumer product or toy housing so as to temporarily adhere the consumer product or toy housing to a smooth support surface. In the preferred practice, the consumer product or toy housing may provide a fanciful or amusing ornamental appearance in the form of a fanciful or amusing toy housing so that users thereof may easily attach and easily remove the toy housing to a smooth support surface.

BACKGROUND OF THE INVENTION

U.S. Pat. No. 1,871,113 ('113 Patent), issued to Comptor et al., discloses a Cup, Adherent through Mechanical Pressure. The '113 Patent describes a suction cup having a semispherical elastic member adapted to contact with a smooth surface and a semispherical metallic member positioned on an exterior surface of the elastic member having a rim adapted to press against the elastic member. A threaded screw passes through the elastic member and the metallic member and has its head fixed to the elastic member via an air-tight joint. The screw aids the user in varying the contact between the elastic and metallic members to control the suction within the elastic member when the latter is in contact with the smooth surface.

U.S. Pat. No. 2,319,727 ('727 Patent), issued to Duggan, discloses a Suction Cup Structure. The '727 Patent describes a suction cup structure having a body of resilient material provided with a suction face. The body has a spherical hole having substantially cylindrical openings at substantially diametrically opposite sides of the hole. One opening extends outwardly through the body to the exterior, and the other extends inwardly through the body to the suction face. A valve within the spherical hole, and outwardly extending opening closes the inwardly extending opening. The resiliency of the material permits distortion of the walls of the hold by the valve to establish communication between the inwardly extending opening and the exterior of the body.

U.S. Pat. No. 4,196,882 ('882 Patent), issued to Rognon, discloses a Double Suction Cup Holder with Vacuum Control Valve. The '882 Patent describes a double suction cup holder in which the two suction cups are connected by a stem has a longitudinal air passageway through the stem connecting the two cups. A diametrical opening traverses the passageway and has a valve member rotatably mounted therein which has inter-communicating longitudinal and diametrical bores. When the valve is turned so that its diametrical bore communicates with the air passageway, the vacuum in the cups is spoiled releasing the holder.

U.S. Pat. No. 5,381,990 ('990 Patent), issued to Belokin et al., discloses a Releasable Suction Cup Assembly. The '990 Patent describes certain releasable suction cup assemblies for use in supporting an object on a smooth surface are formed by a cup body which has a duct passing therethrough and a valve element for selectively opening the duct whereby the vacuum of the suction cup can be released for repositioning the suction cup. The valve extends through the duct and is threaded on one end to receive a threaded fastener which is used to move the valve element into a sealing position and to secure the suction cup to an object. The stem portion of the suction cup may have an annular slot therein and an expanded lip which is deformed outwardly by inserting a plug in the slot.

U.S. Pat. No. 5,511,752 ('752 Patent), issued to Trethewey, discloses a Suction Cup with Valve. The '752 Patent describes an axially repositionable cap mounted upon the stem portion of a suction cup. The axially repositionable cap is axially repositionable by axial and/or tilting movement relative to the stem to selectively close or open fluid communication between the concave space defined by the cup element of the suction cup and the ambient environment.

U.S. Pat. No. 5,711,501 ('501 Patent), issued to Belokin et al., discloses a Suction Cup Attachment Assembly. The '501 Patent describes certain releasable suction cup assemblies for use in supporting objects on smooth surfaces that are formed by a cup body which has a neck with a bore passing therethrough and a valve for selectively opening and closing the bore. The valve extends through the bore and has a retainer on one end which moves the valve into a sealing position to secure the cup to the smooth surface and deformably wedges the neck against the object to secure the object to the suction cup. The vacuum of the suction cup can be released for repositioning the cup.

U.S. Pat. No. 5,996,806 ('806 Patent), issued to Adams, discloses a Suction Cup Sign Holder. The '806 Patent describes a suction sign holder having a suction cup and a tack element. The suction cup and tack element have mating surfaces between which a sign is held. The mating surfaces can be provided with a plurality of concentric grooves and ridges or other projections which mate together and frictionally hold a sign therebetween. The shaft of the tack element can be provided with a raised rib or a groove disposed on the shaft of the tack at an angle. The rib may additionally have a sloping leading edge and a perpendicular trailing edge such that the shaft is easily inserted yet resists backing out of the bore.

U.S. Pat. No. 6,213,521 ('521 Patent), issued to Land, et al., discloses a Quick Release and Bayonet Connector for a Suction Cup. The '521 Patent describes a quick release mount for a suction cup and a locking member for releasably locking the suction cup within a housing. The suction cup mount includes a bayonet coupling which is attached to the suction cup. The bayonet coupling is received within a space located within the housing. The housing further includes a pair of semi-circular flanges for securing the bayonet coupling within the space. The locking member selectively engages the bayonet coupling when the bayonet coupling is moved from an unlocked position to a locked position. The housing also includes a button coupled to the locking member that can release the locking member from engagement with the bayonet coupling and permit unlocking of the bayonet coupling from the housing.

US Patent Application Publication No. 2017/0275104 authored by Tell describes a handling device for handling foodstuff, comprising a suction cup and a docking piece supporting the suction cup. The suction cup is removably attached to the docking piece, which piece comprises a drive nozzle inserted into the suction cup attached to the docking piece for ejecting a fluid from the drive nozzle inside of the suction cup. The suction cup comprises a drive opening for receiving the drive nozzle of the docking piece. An outlet nozzle has at least one constriction which outlet nozzle is aligned with the drive nozzle so that the drive nozzle and the outlet nozzle cooperate to form an ejector, and a suction opening for applying a suction force provided by the ejector to a surface of the foodstuff to be handled.

The prior art perceives a need for a consumer product or toy ensemble comprising an consumer product (e.g. toy) housing, a suction cup formation, a relief valve formation, and an optional collar element basically arranged to allow ease of removal from a smooth surface and which can support the weight of the consumer product ensemble by way of particularly structured components as summarized in more detail hereinafter.

SUMMARY OF THE INVENTION

The present invention basically provides a consumer product or toy provided as a suction cup ensemble-toy combination or suction cup ensemble. The consumer product or toy suction cup ensemble according to the present invention preferably comprises a consumer product or toy housing; a suction cup formation; a relief valve formation; and an optional C-shaped collar element. The consumer product or toy housing may preferably include both an upper housing section and a lower housing section. The lower housing section or portion preferably comprises a circular stem-letting aperture.

The suction cup formation is preferably formed from a collapsible, deformable, or resilient material and preferably comprises a collapsible or resilient cup portion and a stem portion. The collapsible cup portion has inner cup surfacing. The stem portion preferably comprises a lower stem section; an upper stem section; an intermediate stem section intermediate the lower and upper stem sections; and a valve-letting passage extending through the stem portion to the inner cup surfacing of the collapsible cup portion. The lower stem section and the upper stem section each comprise an overall girth greater in magnitude relative to the intermediate, collar-receiving stem section. The circular stem-letting aperture of the lower housing section is dimensioned to receive the lower stem section of the suction cup formation.

The relief valve formation preferably comprises a valve stem, a valve stop portion, and a valve upper portion. The valve stem preferably comprises a valve stem end and opposed valve stem grooves. The opposed valve stem grooves extend from the valve stem end toward the valve stop portion and each preferably comprises a groove length lesser than the length of the valve stem thereby forming a full diameter valve-sealing portion in adjacency to the valve stop portion. The valve stem is dimensioned for receipt within the valve-letting passage of the suction cup formation.

The optional collar element is preferably and generally C-shaped such that the collar element preferably further comprises an outer collar periphery, an inner slot portion, and a collar element thickness. The outer collar periphery preferably has an outer collar diameter, and the inner slot portion preferably comprises a substantially uniform inner slot width with a radiused inner end cooperable with the outer perimeter of the intermediate, collar-receiving stem section. The inner slot width is dimensioned for accepting the diameter of the intermediate, collar-receiving stem section, and the outer collar diameter is preferably greater in magnitude relative to the aperture diameter of the stem-letting aperture.

The consumer product or toy housing is pressable or directable toward the suction cup formation such that, in a first embodiment, the upper housing section engages the valve upper portion for driving the valve stop portion into engagement with the upper stem portion and the valve-sealing portion into passage-sealing engagement within the valve-letting passage. The optional collar element primarily functions to retain the upper stem section inside the toy housing during the action of pressing or directing the consumer product or toy housing toward the suction cup formation.

The collapsible cup portion, being formed from a resilient material, is collapsible against a smooth attachment surface for creating a vacuumed chamber at the inner cup surfacing. According to well understood physical principles, the vacuumed chamber operates to retain the ensemble upon the smooth attachment surface. The consumer product or toy housing is re-directable away from the suction cup formation such that the lower housing section in a first embodiment engages the valve upper portion for removing the valve-sealing portion from the valve-letting passage thereby letting air to enter the opposed stem grooves for equalizing pressure at the inner cup surfacing and releasing the ensemble from the smooth attachment surface.

The reader will further consider that the first embodiment of the consumer product or toy ensemble according to the present invention further preferably provides the lower housing section with a series of lower housing posts that extend toward the upper housing section. The series of lower housing posts are preferably arranged in adjacency to the stem-letting aperture in substantially tangential relation to the optional collar element for post-guiding the collar element during movement as it rides upon the intermediate stem section between the collapsed, actuated, vacuum-creating cup configuration and the relaxed, vacuum-releasing configuration.

The series of lower housing posts further operate to engage a first side of the valve upper portion for removing the valve-sealing portion from the valve-letting passage when the toy housing is directable away from the suction cup formation. The series of lower housing posts are preferably arranged in equidistant relation relative to the stem-letting aperture such that the outer collar periphery is substantially tangent to the series of lower housing posts and that together the lower housing posts and collar element maintain axial displacement of the valve stem relative to the valve-letting passage.

Similarly, the upper housing section of the first embodiment may be preferably outfitted with or comprise a series of upper housing posts that extend toward the lower housing section. The series of upper housing posts operate to engage a second side of the valve upper portion for driving the valve stop portion into engagement with the upper stem portion, and the valve-sealing portion into passage-sealing engagement within the valve-letting passage. The series of lower housing posts and the series of upper housing posts are preferably and respectively in axial alignment with one another.

The consumer product or toy ensemble according to the present invention may further preferably comprise an outwardly extending support ring integrally formed with the lower housing section, or alternatively, a series of outwardly extending support ribs. Either the outwardly extending support ring or the series of outwardly extending support ribs basically operate to contact the smooth attachment surface when placed under an ensemble-bending load and enhances support of the suction cup ensemble-toy combination when attached to such a (vertical) smooth attachment surface.

BRIEF DESCRIPTIONS OF THE DRAWINGS

Other features of the invention will become more evident from a consideration of the following brief descriptions of the illustrations submitted in support of the subject invention:

FIG. 10 is a side elevational view of the suction cup ensemble-toy combination according to the present invention with the relief valve formation and collar element removed.

FIG. 10A is a medial longitudinal cross-sectional view of the suction cup ensemble-toy combination according to the present invention as sectioned from FIG. 10 with the relief valve formation and collar element removed.

FIG. 10B is a paramedial or offset longitudinal cross-sectional view of the suction cup ensemble-toy combination according to the present invention as sectioned from FIG. 10 with the relief valve formation and collar element removed.

FIG. 19 is a top plan view of the suction cup formation according to the present invention.

FIG. 20 is a top perspective view of the suction cup formation in a collapsed or actuated, vacuum-chamber forming configuration.

FIG. 21 is a top perspective view of the suction cup formation in a relaxed configuration.

FIG. 22 is a side elevational view of the suction cup formation in the collapsed or actuated, vacuum-chamber forming configuration.

FIG. 23 is a side elevational view of the suction cup formation in the relaxed configuration.

Figure 56:
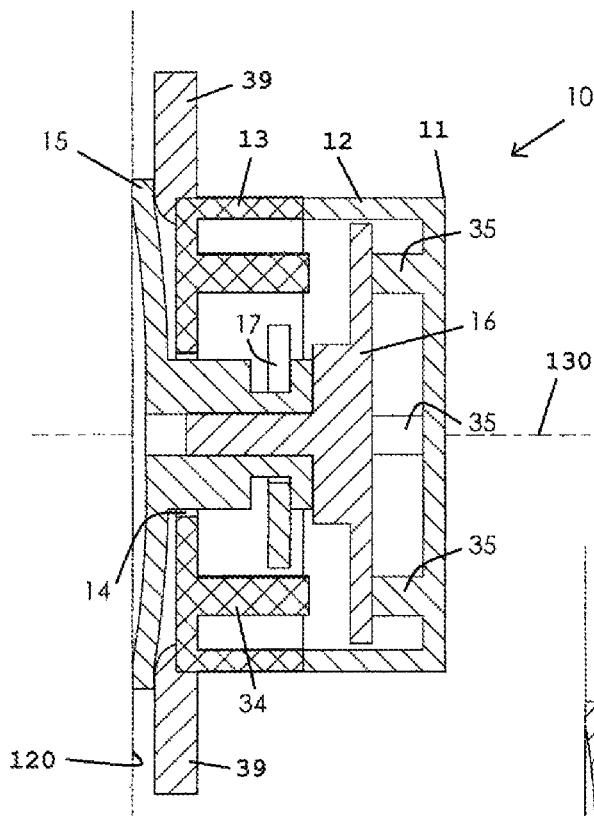

FIG. 56 is a longitudinal cross-sectional view of the first alternative suction cup ensemble-toy combination according to the present invention depicting the first alternative suction cup ensemble-toy combination in the collapsed or actuated, vacuum-chamber forming configuration for attaching the first alternative suction cup ensemble-toy combination to a vertically oriented smooth surface in zero gravity.

Figure 57:
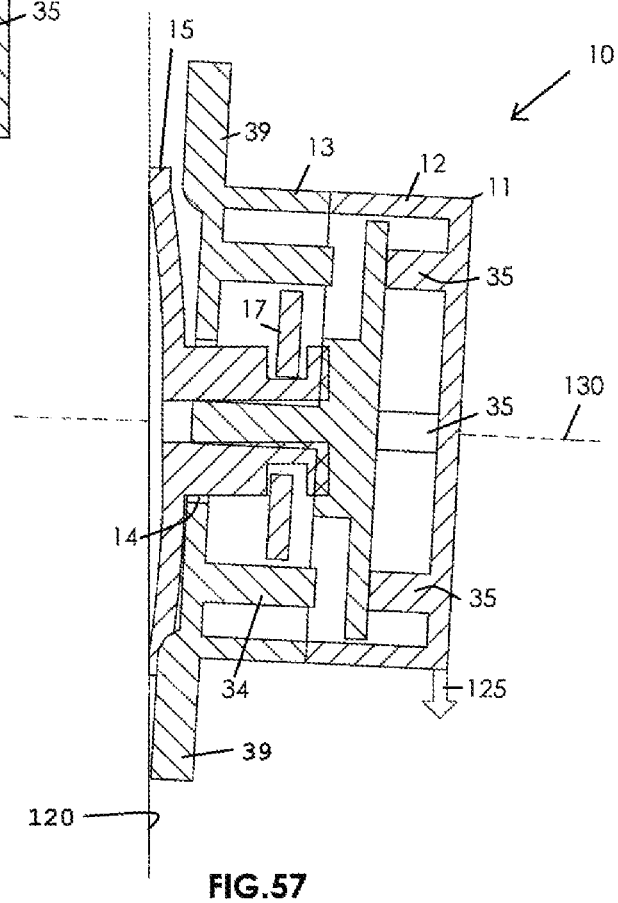

FIG. 57 is a longitudinal cross-sectional view of the first alternative suction cup ensemble-toy combination according to the present invention depicting the first alternative suction cup ensemble-toy combination in the collapsed or actuated, vacuum-chamber forming configuration for attaching the first alternative suction cup ensemble-toy combination to a vertically oriented smooth surface such that the first alternative suction cup ensemble-toy combination has weight and undergoes slight leaning, the outwardly extending ring formation of the lower housing section engaging the smooth surface to enhance support of the first alternative suction cup ensemble-toy combination.

Figure 58:
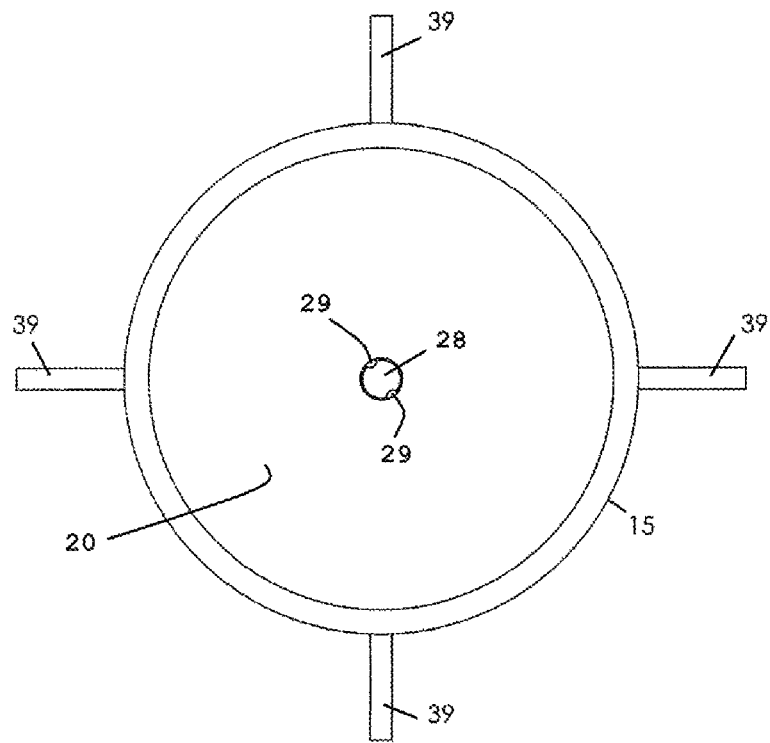

FIG. 58 is a bottom plan view of the second alternative suction cup ensemble-toy combination according to the present invention.

Figure 59:
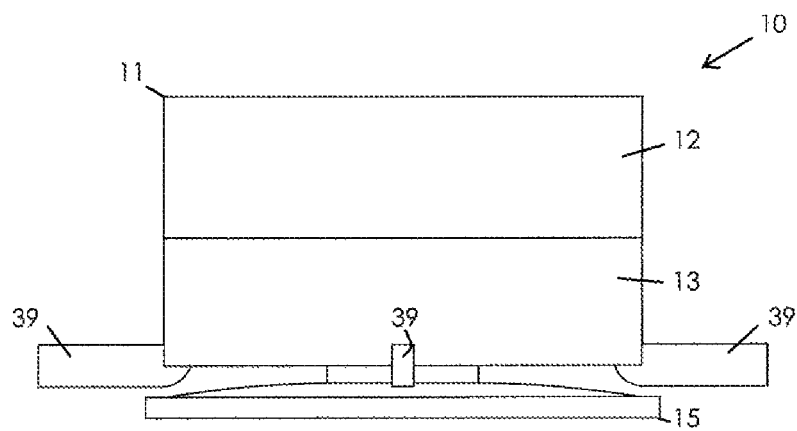

FIG. 59 is a bottom perspective view of the second alternative suction cup ensemble-toy combination according to the present invention.

Figure 60:
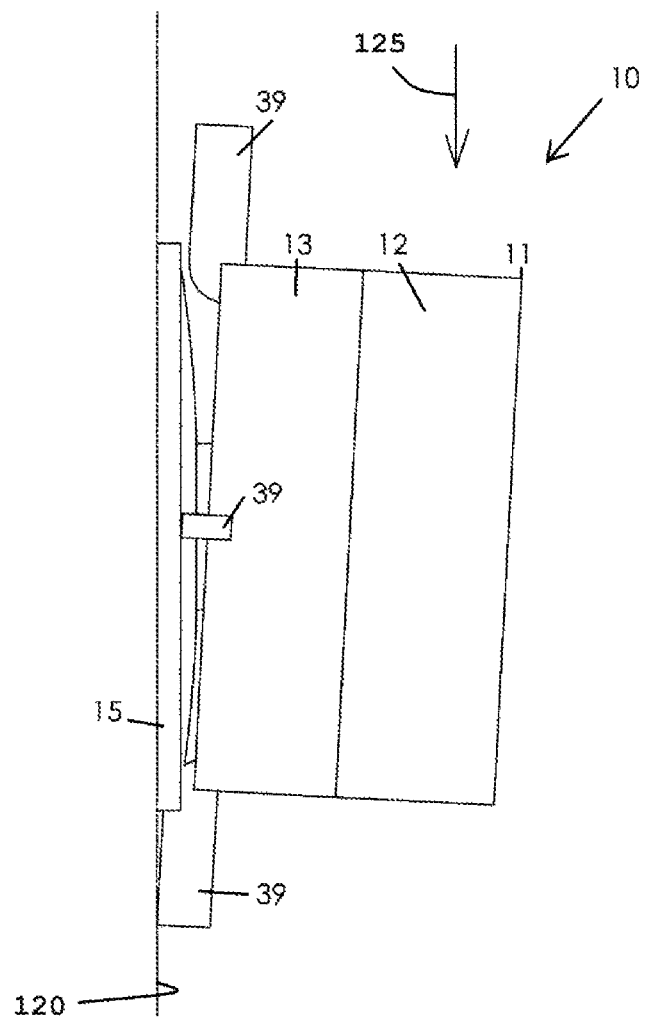

FIG. 60 is a side elevational view of the second alternative suction cup ensemble-toy combination according to the present invention depicting the second alternative suction cup ensemble-toy combination in the collapsed or actuated, vacuum-chamber forming configuration for attaching the second alternative suction cup ensemble-toy combination to a vertically oriented smooth surface such that the second alternative suction cup ensemble-toy combination has weight and undergoes slight leaning, a select outwardly extending rib formation of the lower housing section engaging the smooth surface to enhance support of the second alternative suction cup ensemble-toy combination.

FIG. 61 is a side elevational view of a third alternative suction cup ensemble-toy combination according to the present invention.

FIG. 62 is a top perspective view of the third alternative suction cup ensemble-toy combination according to the present invention.

FIG. 63 is a bottom plan view of the third alternative suction cup ensemble-toy combination according to the present invention.

FIG. 64 is a bottom perspective view of the third alternative suction cup ensemble-toy combination according to the present invention.

Figure 65:
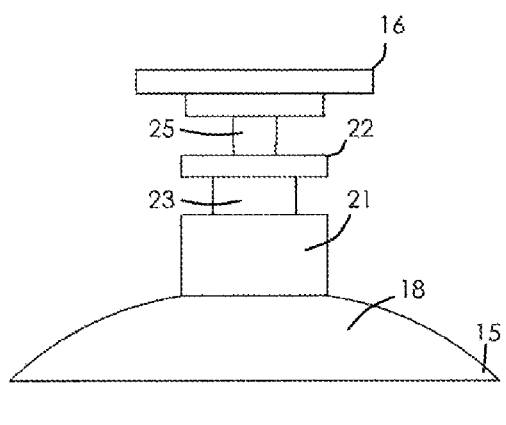

FIG. 65 is a side elevational view of the suction cup formation and relief valve formation in assembled relation to one another and usable in combination with the third alternative suction cup ensemble-toy combination according to the present invention.

Figure 66:
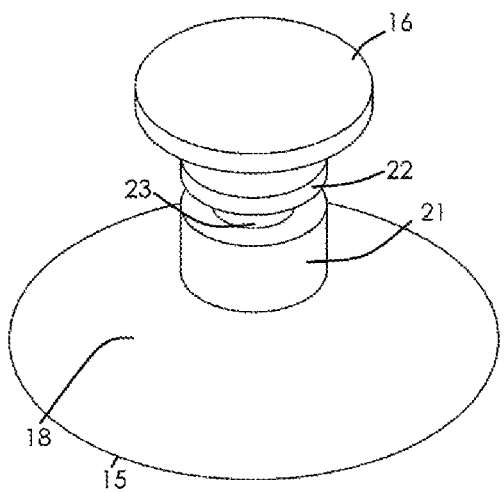

FIG. 66 is a top perspective view of the suction cup formation and relief valve formation in assembled relation to one another and usable in combination with the third alternative suction cup ensemble-toy combination according to the present invention.

Figure 67:
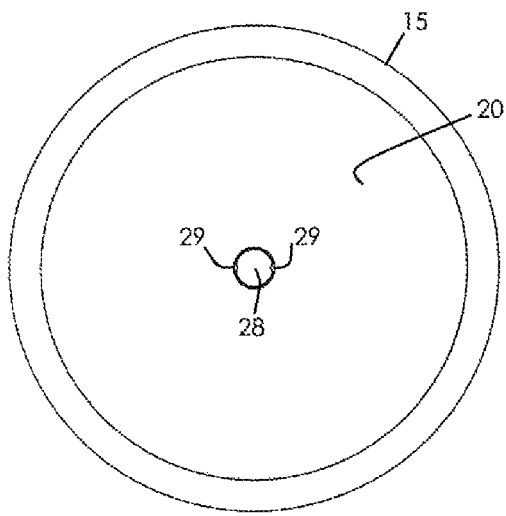

FIG. 67 is a bottom plan view of the suction cup formation and relief valve formation in assembled relation to one another and usable in combination with the third alternative suction cup ensemble-toy combination according to the present invention.

Figure 68:
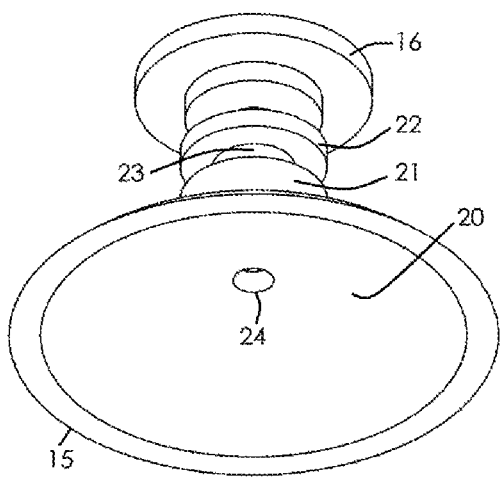

FIG. 68 is a bottom perspective view of the suction cup formation and relief valve formation in assembled relation to one another and usable in combination with the third alternative suction cup ensemble-toy combination according to the present invention.

Figure 69:
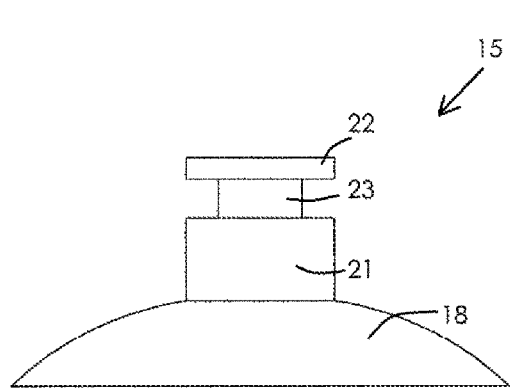

FIG. 69 is a side elevational view of the suction cup formation usable in combination with the third alternative suction cup ensemble-toy combination according to the present invention.

Figure 70:
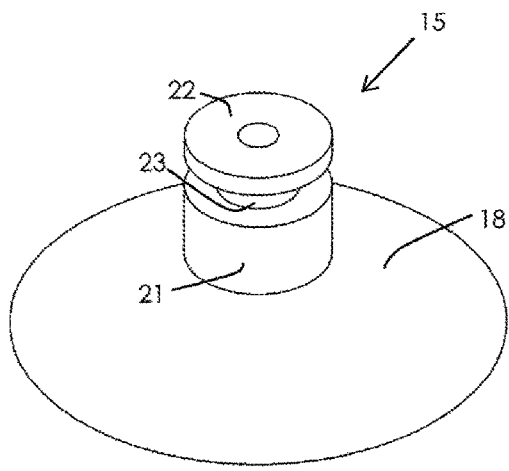

FIG. 70 is a top perspective view of the suction cup formation usable in combination with the third alternative suction cup ensemble-toy combination according to the present invention.

Figure 71:
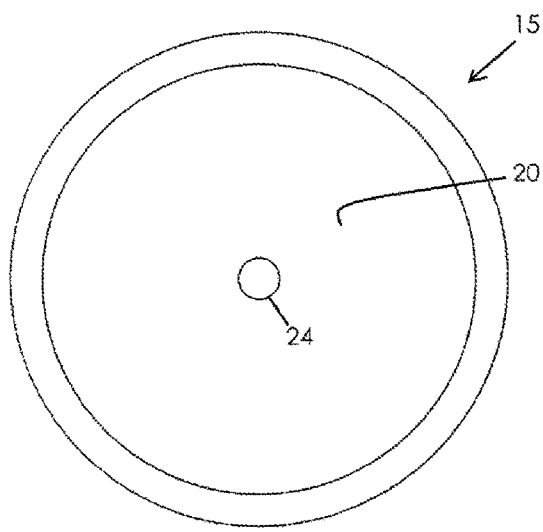

FIG. 71 is a bottom plan view of the suction cup formation usable in combination with the third alternative suction cup ensemble-toy combination according to the present invention.

Figure 72:
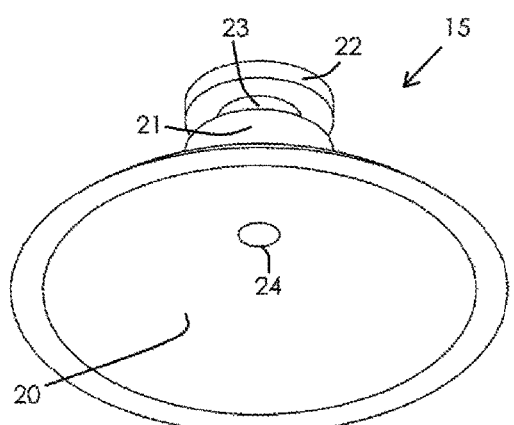

FIG. 72 is a bottom perspective view of the suction cup formation usable in combination with the third alternative suction cup ensemble-toy combination according to the present invention.

Figure 73:
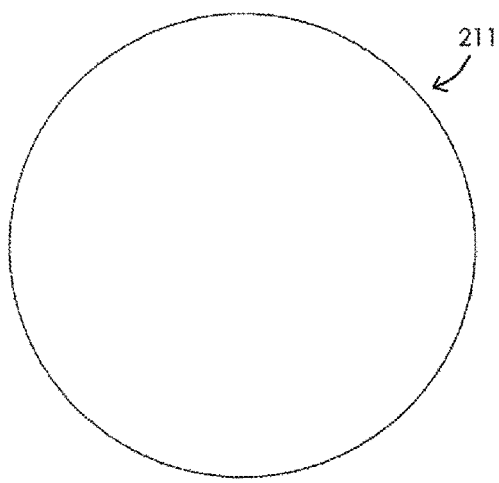

FIG. 73 is a top plan view of the consumer product or toy housing structure of the third alternative suction cup ensemble-toy combination according to the present invention.

Figure 74:
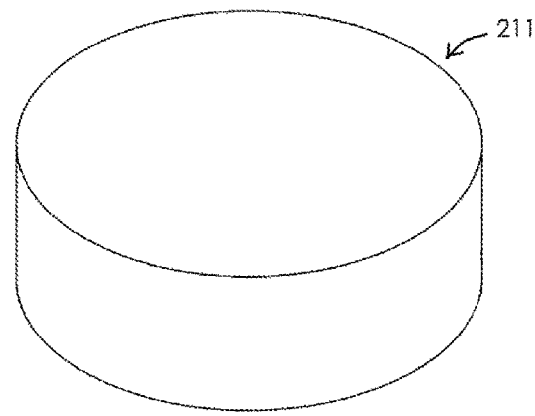

FIG. 74 is a top perspective view of the consumer product or toy housing structure of the third alternative suction cup ensemble-toy combination according to the present invention.

Figure 75:

FIG. 75 is a side elevational view of the consumer product or toy housing structure of the third alternative suction cup ensemble-toy combination according to the present invention.

Figure 76:
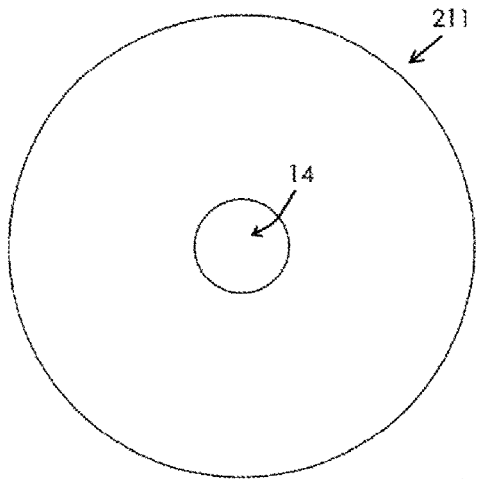

FIG. 76 is a bottom plan view of the consumer product or toy housing structure of the third alternative suction cup ensemble-toy combination according to the present invention.

Figure 77:
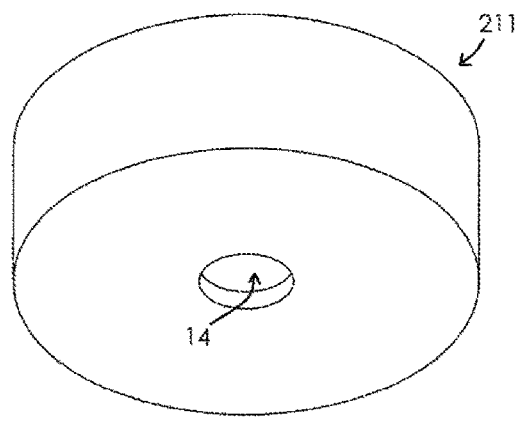

FIG. 77 is a bottom perspective view of the consumer product or toy housing structure of the third alternative suction cup ensemble-toy combination according to the present invention.

Figure 78:
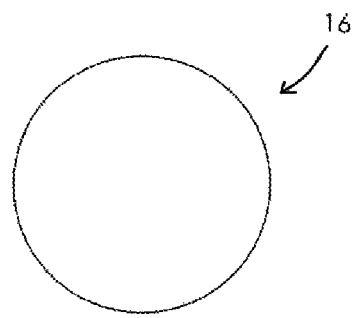

FIG. 78 is a top plan view of the relief valve formation usable in combination with the third alternative suction cup ensemble-toy combination according to the present invention.

Figure 79:
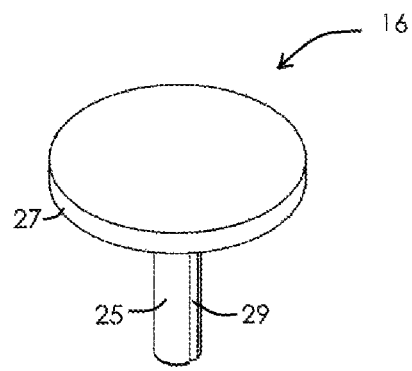

FIG. 79 is a top perspective view of the relief valve formation usable in combination with the third alternative suction cup ensemble-toy combination according to the present invention.

Figure 80:
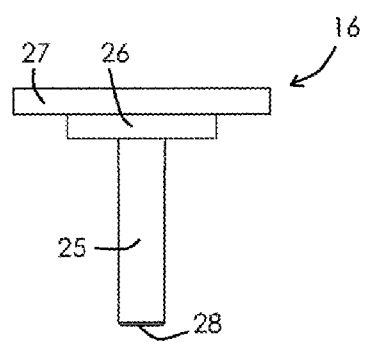

FIG. 80 is a side elevational view of the relief valve formation usable in combination with the third alternative suction cup ensemble-toy combination according to the present invention.

Figure 81:
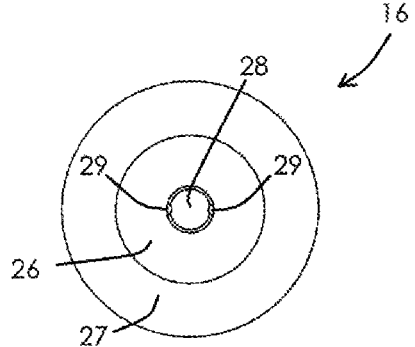

FIG. 81 is a bottom plan view of the relief valve formation usable in combination with the third alternative suction cup ensemble-toy combination according to the present invention.

Figure 82:
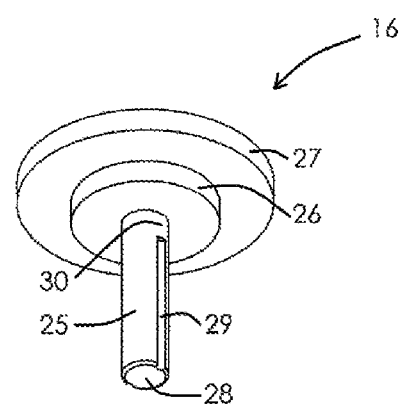

FIG. 82 is a bottom perspective view of the relief valve formation usable in combination with the third alternative suction cup ensemble-toy combination according to the present invention.

Figure 83:
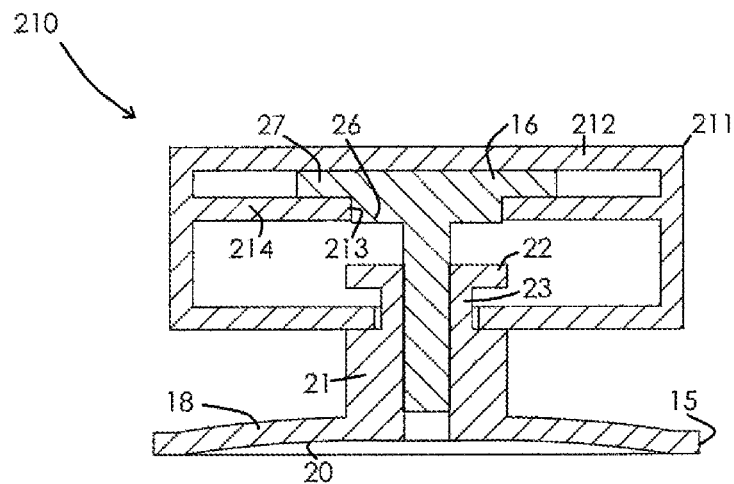

FIG. 83 is a longitudinal cross-sectional view of the third alternative suction cup ensemble-toy combination according to the present invention depicting the third alternative suction cup ensemble-toy combination in the collapsed or actuated, vacuum-chamber forming configuration.

Figure 84:
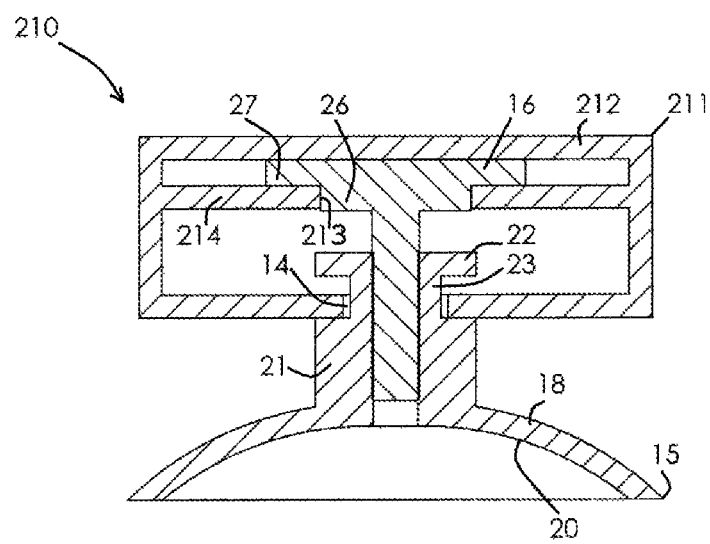

FIG. 84 is a longitudinal cross-sectional view of the third alternative suction cup ensemble-toy combination according to the present invention depicting the third alternative suction cup ensemble-toy combination in the relaxed configuration.

Figure 85:
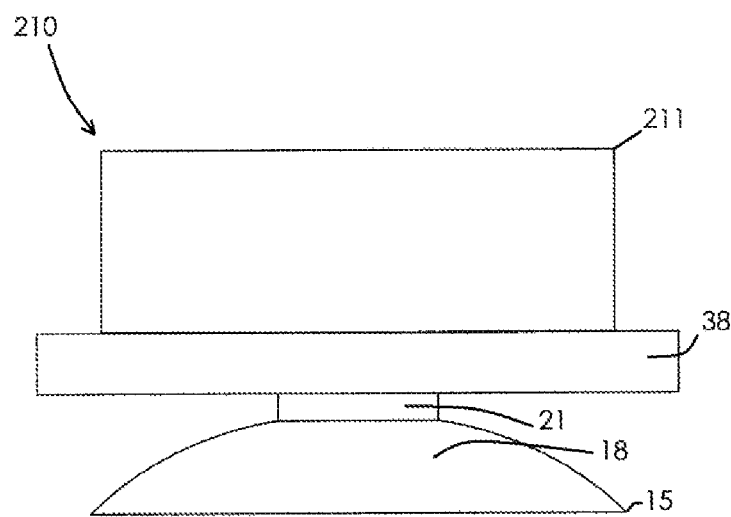

FIG. 85 is a side elevational view of a fourth alternative suction cup ensemble-toy combination according to the present invention depicting an optional support ring integrally formed with the consumer product or toy housing.

Figure 86:
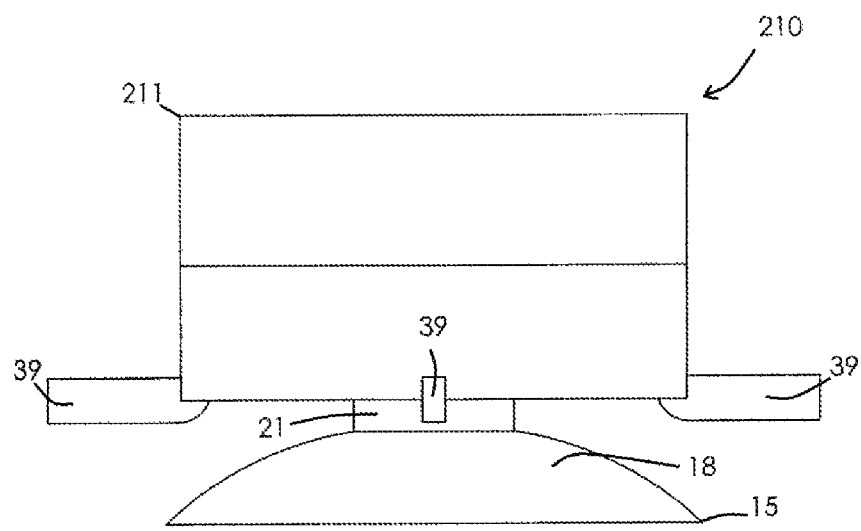

FIG. 86 is a side elevational view of a fifth alternative suction cup ensemble-toy combination according to the present invention depicting optional support ribs integrally formed with the consumer product or toy housing.

DETAILED DESCRIPTION OF THE PREFERRED EMBODIMENTS

Referring now to the drawings with more specificity, the present invention preferably provides a consumer product or toy type suction cup ensemble or suction cup-toy combination as generally depicted and referenced at 10 and 210 throughout the drawings submitted in support of these specifications. The first of the two basic embodiments or suction cup ensemble-toy combination 10 preferably comprises a consumer product or toy housing as at 11; a suction cup formation 15; a relief valve formation 16; and a C-shaped collar element as at 17. The toy housing 11 may preferably include both an upper housing section as at 12 and a lower housing section as at 13. The lower housing section 13 preferably comprises a circular stem-letting aperture as at 14, which stem-letting aperture 14 has an aperture diameter as at 100.

The suction cup formation 15 is preferably formed from a collapsible, deformable, or resilient material (e.g. low durometer Polyvinyl Chloride (PVC) or Thermoplastic Elastomer (TPE) or Silicone) and preferably comprises a collapsible or resilient cup portion as at 18 and a stem portion as at 19. The collapsible cup portion 18 has inner cup surfacing as at 20. The stem portion 19 preferably comprises a lower stem section as at 21; an upper stem section as at 22; an intermediate, collar-receiving stem section intermediate the lower and upper stem sections as at 23; and a valve-letting passage 24 extending through the stem portion 19 to the inner cup surfacing 20 of the collapsible cup portion 18.

Figure 1:
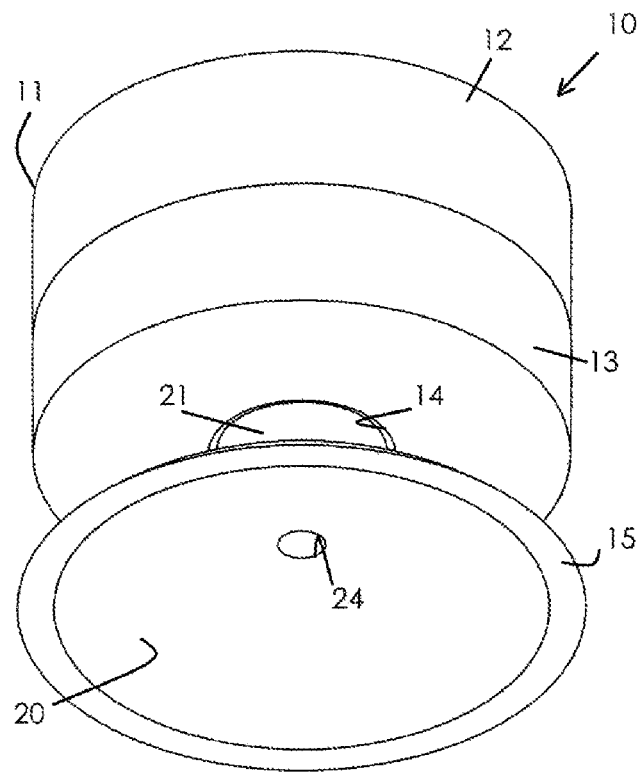
FIG. 1 is a bottom perspective view of the suction cup ensemble-toy combination according to the present invention.
Figure 2:
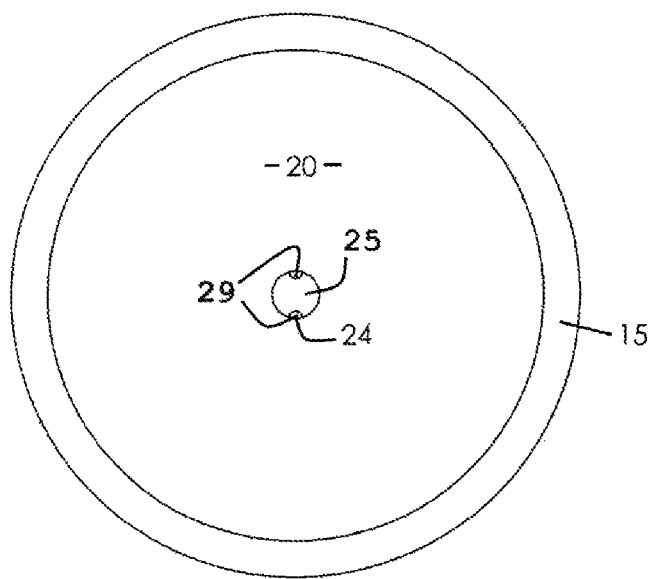
FIG. 2 is a bottom plan view of the suction cup ensemble-toy combination according to the present invention.
Figure 3:
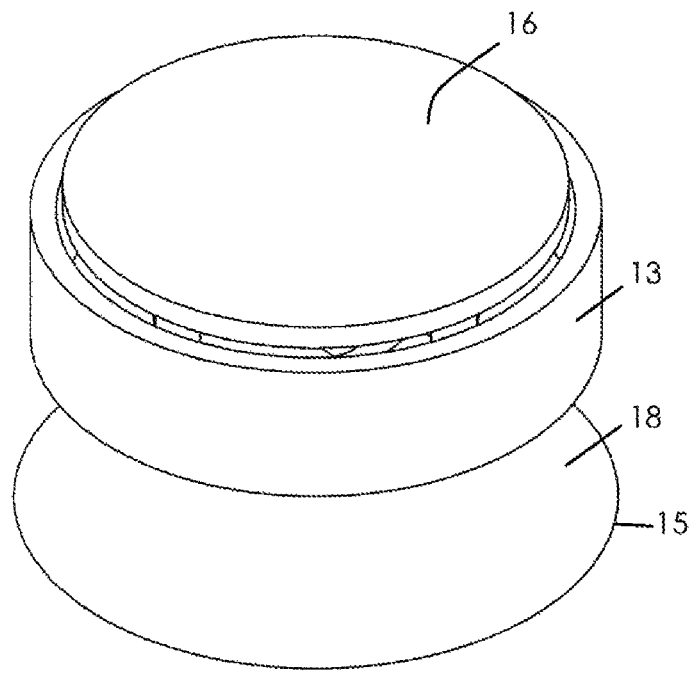
FIG. 3 is a top perspective view of portions of the suction cup ensemble-toy combination according to the present invention with an upper housing section of the toy housing removed to reveal otherwise hidden parts.
Figure 4:
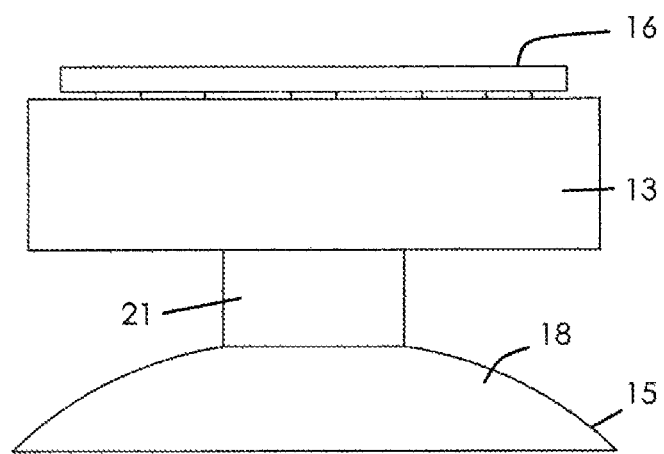
FIG. 4 is a side elevational view of the structures otherwise depicted in FIG. 3.
Figure 5:
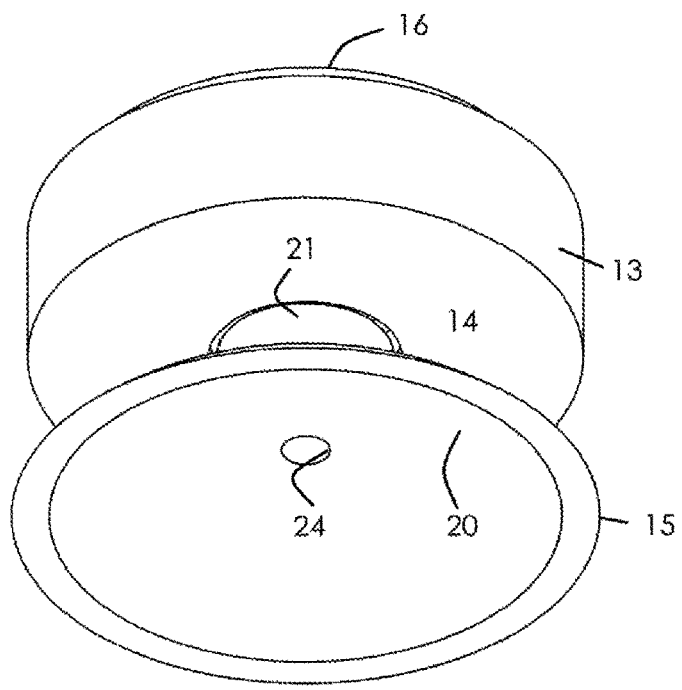
FIG. 5 is a bottom perspective view of the structures otherwise depicted in FIG. 3.
Figure 6:
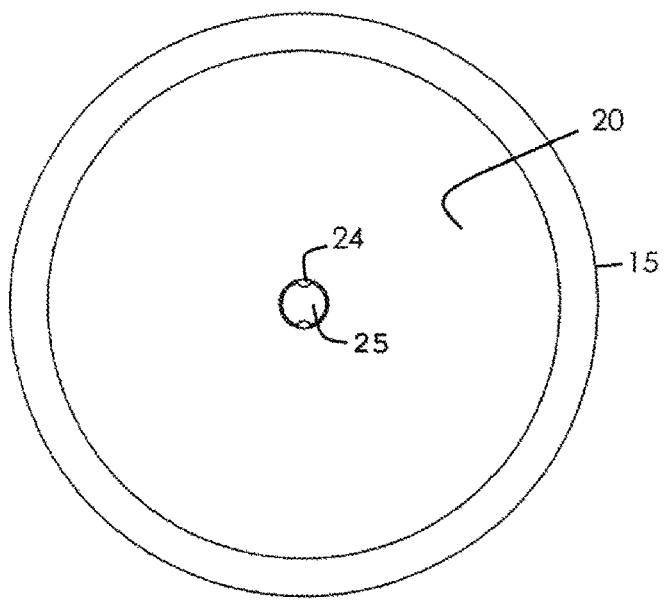
FIG. 6 is a bottom plan view of the structures otherwise depicted in FIG. 3.
Figure 7:
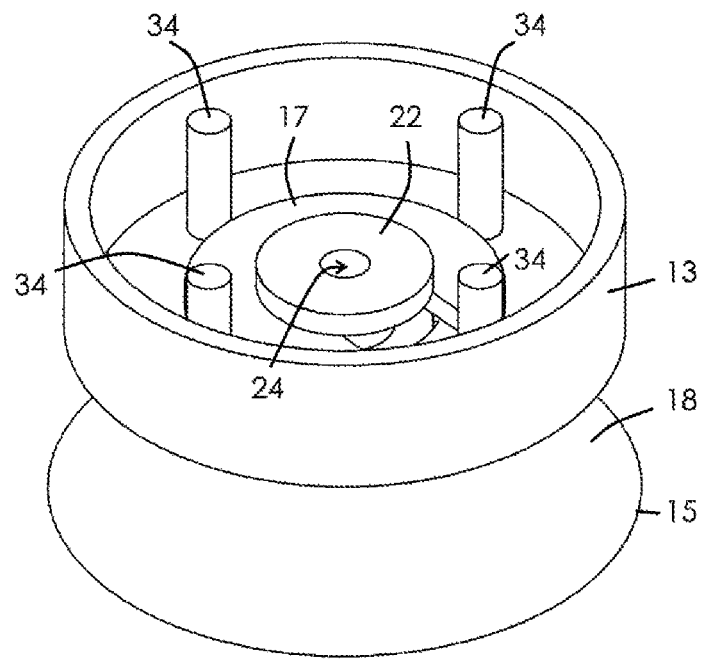
FIG. 7 is a top perspective view of portions of the suction cup ensemble-toy combination according to the present invention with the upper housing section of the toy housing and the relief valve formation removed to reveal otherwise hidden parts, including the suction cup formation and the collar element.
Figure 8:
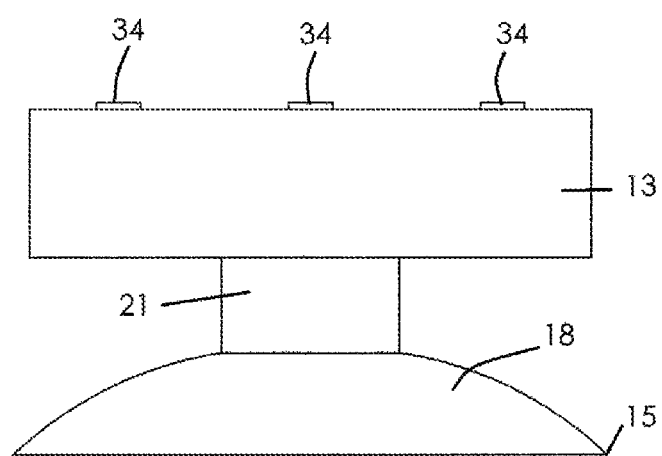
FIG. 8 is a side elevational view of the structures otherwise depicted in FIG. 7.
Figure 9:
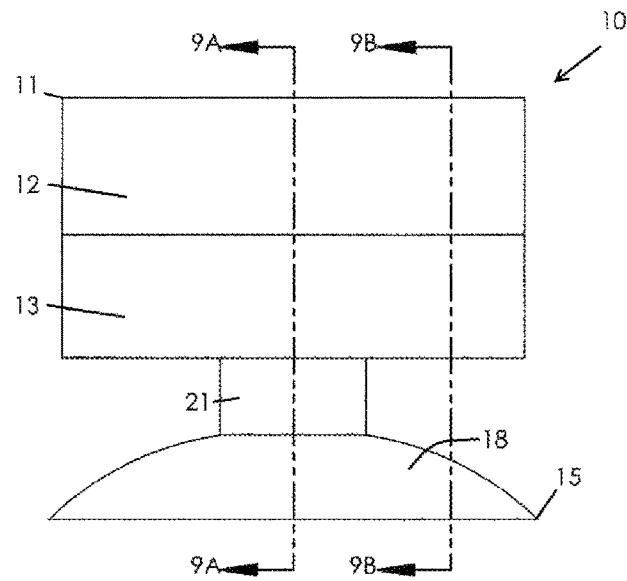
FIG. 9 is a side elevational view of the suction cup ensemble-toy combination according to the present invention.
Figures 9A, 9B:
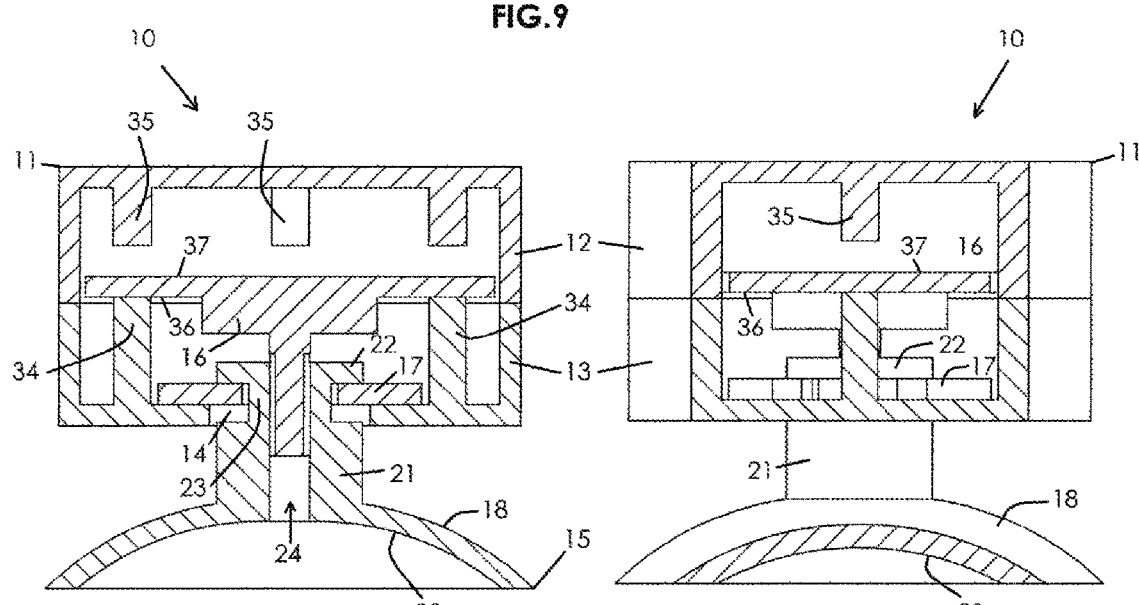
FIG. 9A is a medial longitudinal cross-sectional view of the suction cup ensemble-toy combination according to the present invention as sectioned from FIG. 9 showing all internal parts.
FIG. 9B is a paramedial or offset longitudinal cross-sectional view of the suction cup ensemble-toy combination according to the present invention as sectioned from FIG. 9 showing all internal parts.
Figure 11:
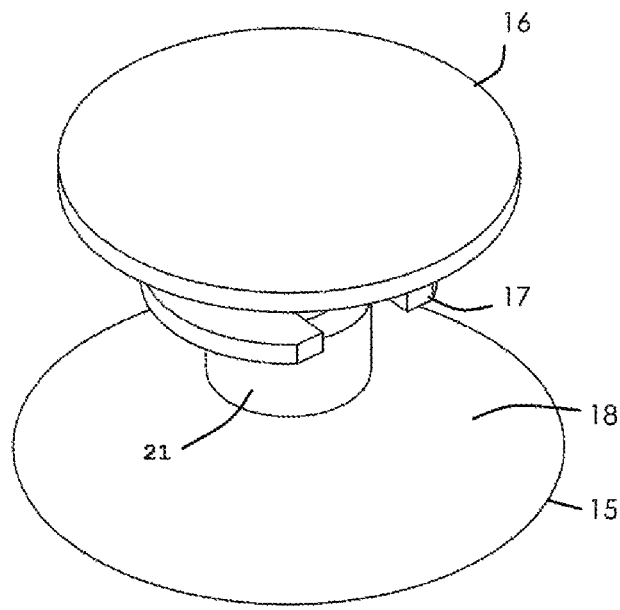
FIG. 11 is a top perspective view of the relief valve formation, collar element, and suction cup formation in assembled relation to one another.
Figure 12:
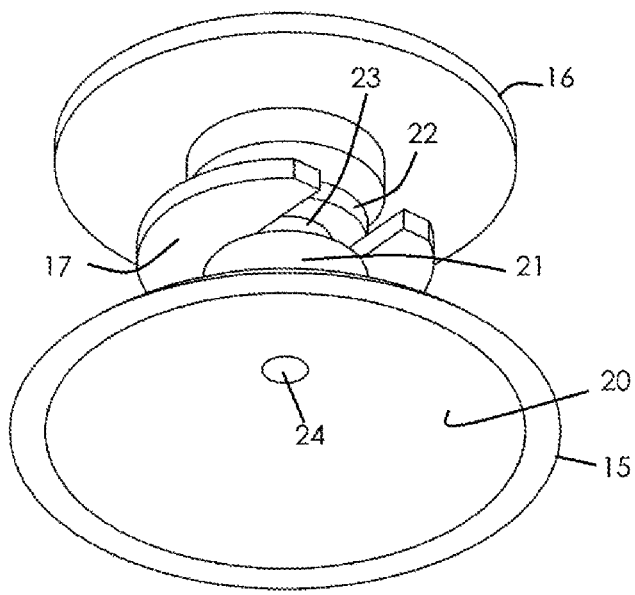
FIG. 12 is a bottom perspective view of the structures otherwise depicted in FIG. 11.
Figure 13:
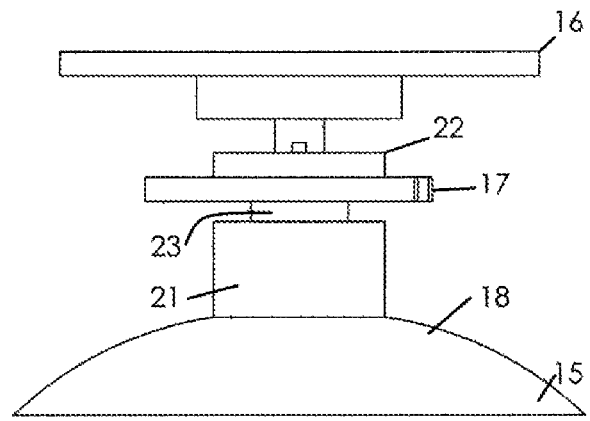
FIG. 13 is a first side elevational view of the structures otherwise depicted in FIG. 11.
Figure 14:
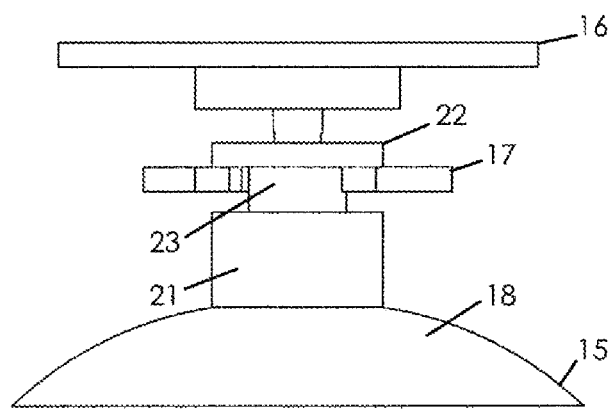
FIG. 14 is a second side elevational view of the structures otherwise depicted in FIG. 11.
Figure 16:
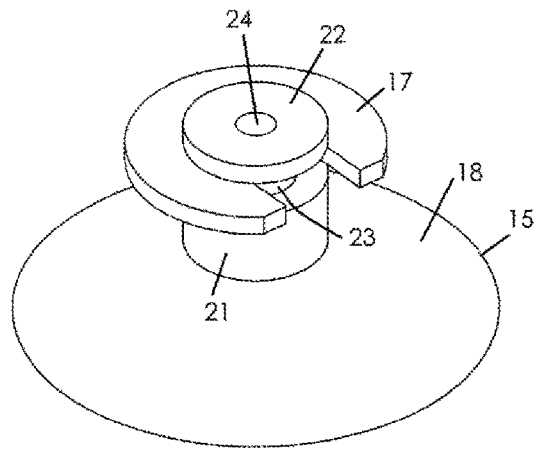
FIG. 16 is a top perspective view of the structures otherwise depicted in FIG. 15.
Figure 15:
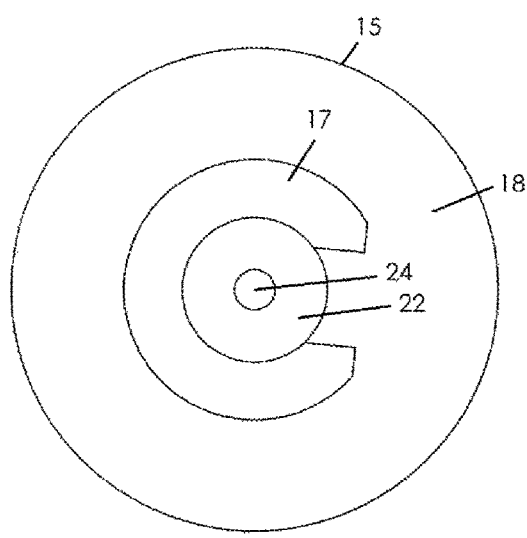
FIG. 15 is a top plan view of the collar element and suction cup formation in assembled relation with one another.
Figure 18:
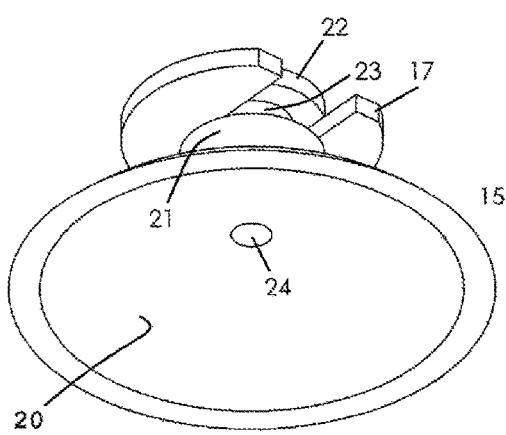
FIG. 18 is a bottom perspective view of the structures otherwise depicted in FIG. 15.
Figure 17:
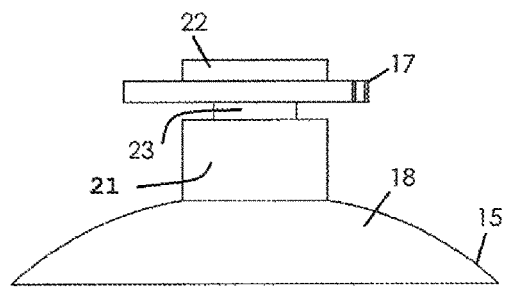
FIG. 17 is a side elevational view of the structures otherwise depicted in FIG. 15.
Figure 23A:
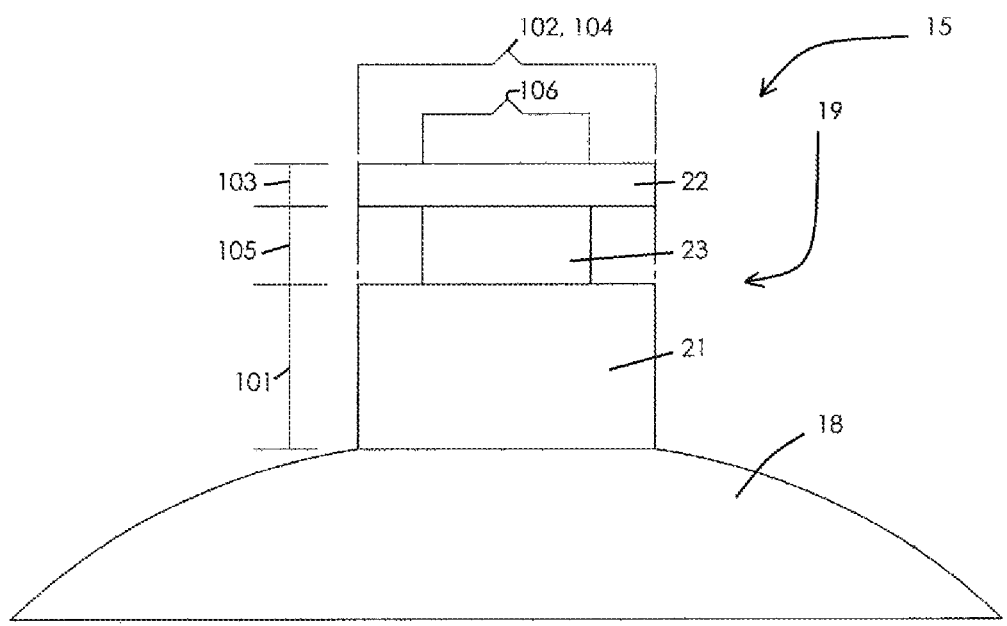
FIG. 23A is an enlarged side elevational view of the suction cup formation in the relaxed configuration, the enlargement being presented to show with greater clarity various features of the suction cup formation.
Figure 25:
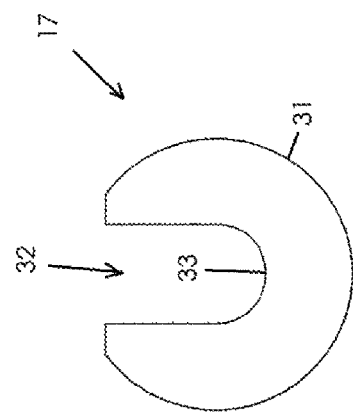
FIG. 25 is a top plan view of the collar element according to the present invention.
Figure 26:
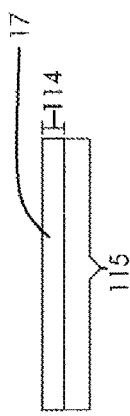
FIG. 26 is a rear edge view of the collar element according to the present invention.
Figure 28:
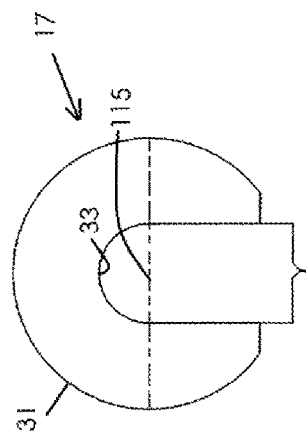
FIG. 28 is a bottom plan view of the collar element according to the present invention.
Figure 24:
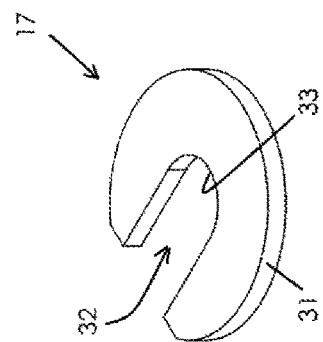
FIG. 24 is a rear top perspective view of the collar element according to the present invention.
Figure 27:
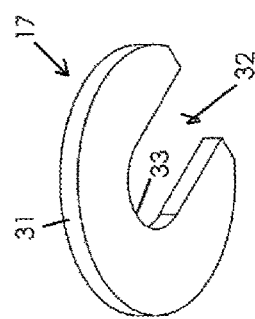
FIG. 27 is a rear bottom perspective view of the collar element according to the present invention.
Figure 29:
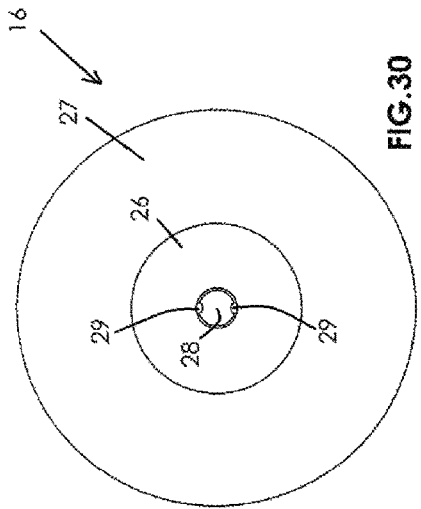
FIG. 29 is a bottom perspective view of the relief valve formation according to the present invention.
Figure 31:
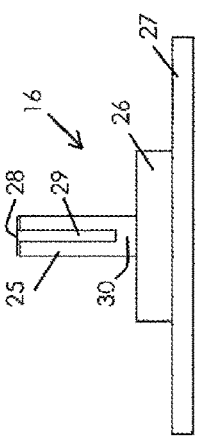
FIG. 31 is a first side elevational view of the relief valve formation according to the present invention.
Figure 33:
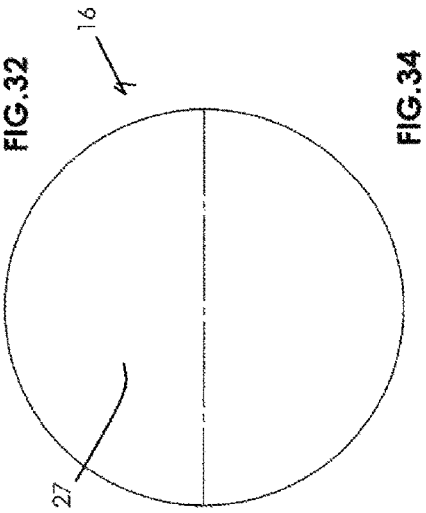
FIG. 33 is a top perspective view of the relief valve formation according to the present invention.
Figure 30:
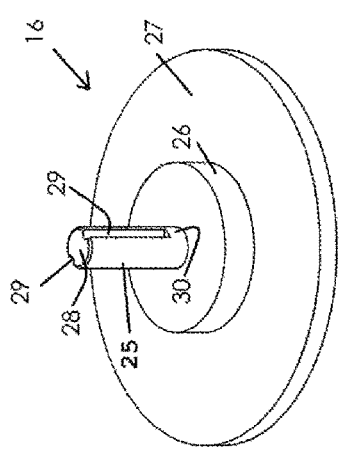
FIG. 30 is a bottom plan view of the relief valve formation according to the present invention.
Figure 32:
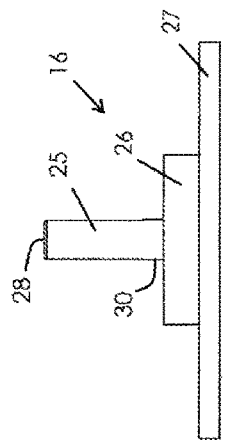
FIG. 32 is a second side elevational view of the relief valve formation according to the present invention rotated 90 degrees from the view otherwise depicted in FIG. 31.
Figure 34:
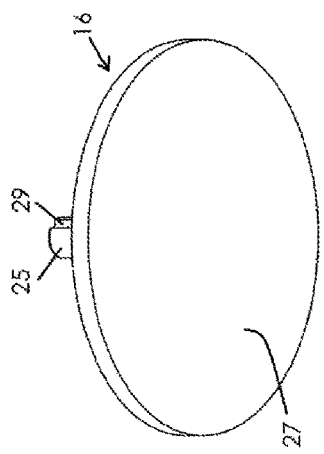
FIG. 34 is a top plan view of the relief valve formation according to the present invention.
Figure 31A:
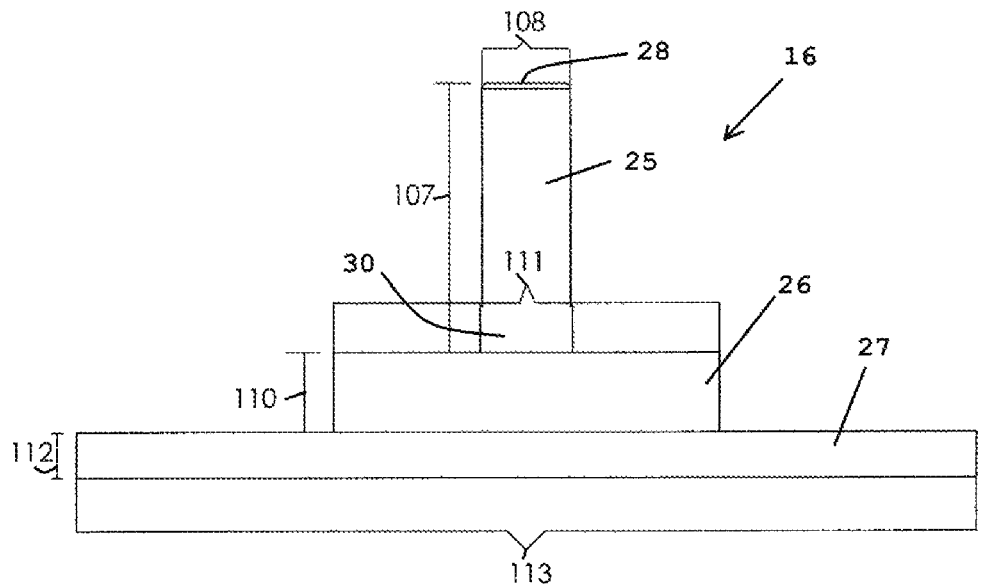
FIG. 31A is an enlarged first side elevational view of the relief valve formation otherwise depicted in FIG. 31, the enlargement being presented to show with greater clarity various features of the relief valve formation.
Figure 32A:
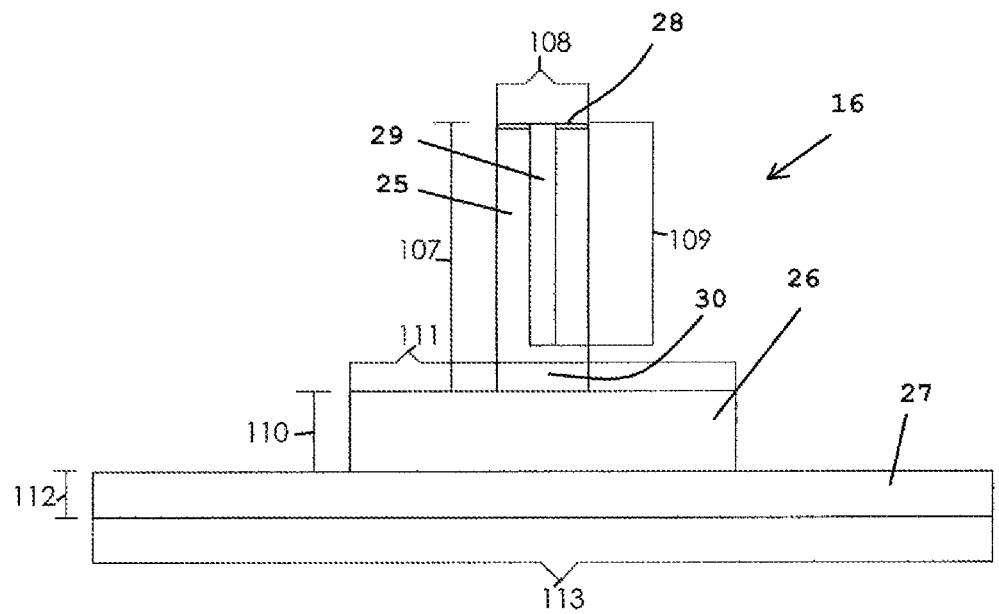
FIG. 32A is an enlarged second side elevational view of the relief valve formation otherwise depicted in FIG. 32, the enlargement being presented to show with greater clarity various features of the relief valve formation.
Figure 36:
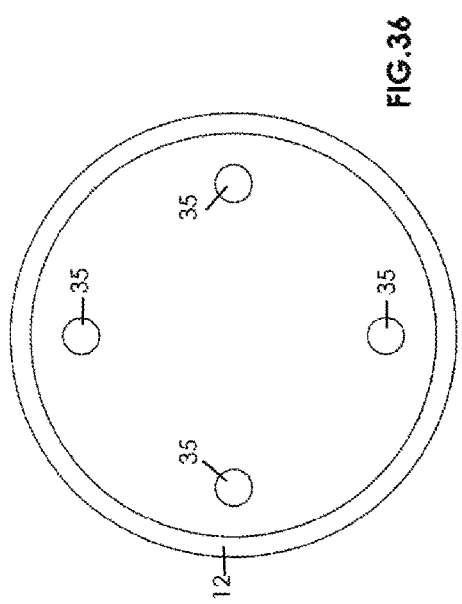
FIG. 36 is a bottom plan view of the generic upper housing section according to the present invention.
Figure 37:
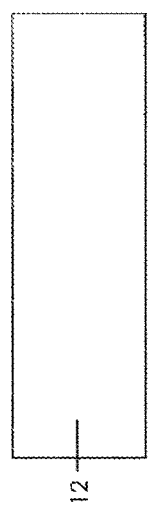
FIG. 37 is a side elevational view of the generic upper housing section according to the present invention.
Figure 39:
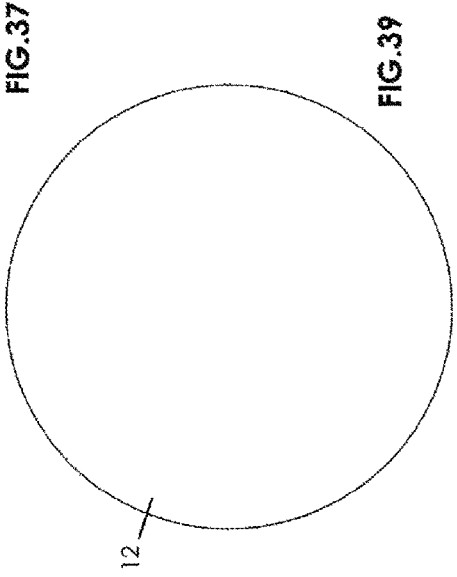
FIG. 39 is a top plan view of the generic upper housing section according to the present invention.
Figure 35:
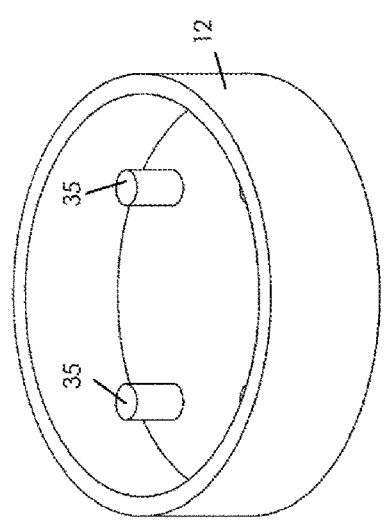
FIG. 35 is a bottom perspective view of a generic upper housing section according to the present invention.
Figure 38:
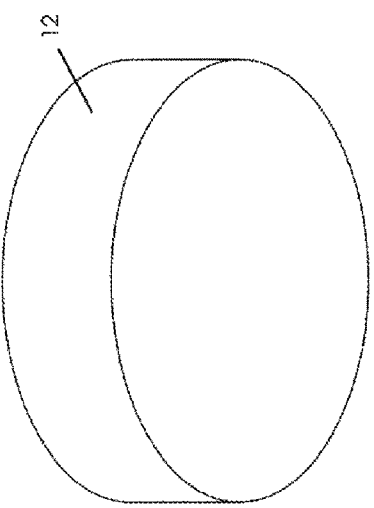
FIG. 38 is a top perspective view of the generic upper housing section according to the present invention.
Figure 40:
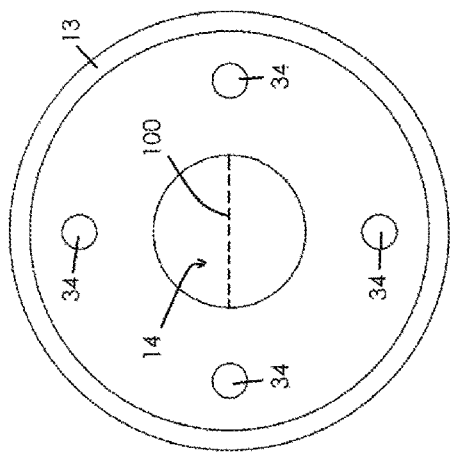
FIG. 40 is a top perspective view of a generic lower housing section according to the present invention.
Figure 41:
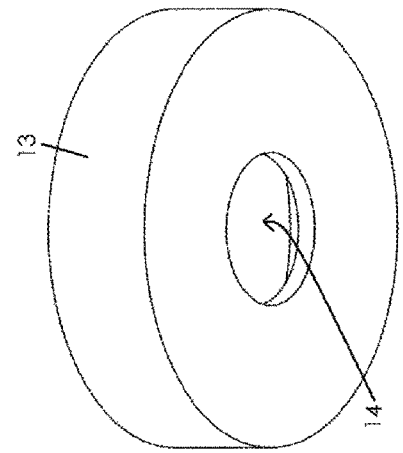
FIG. 41 is a top plan view of the generic lower housing section according to the present invention.
Figure 42:
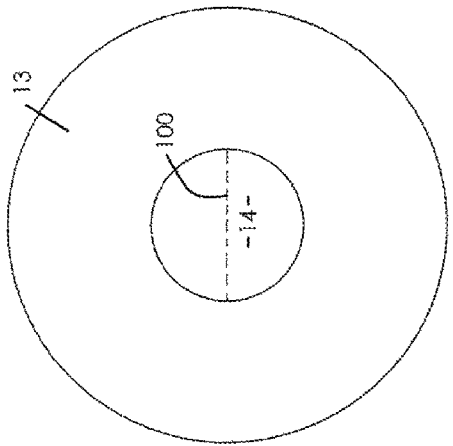
FIG. 42 is a bottom plan view of the generic lower housing section according to the present invention.
Figure 43:
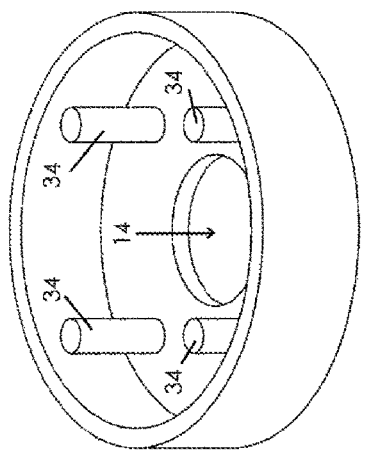
FIG. 43 is a side elevational view of the generic lower housing section according to the present invention.
Figure 44:
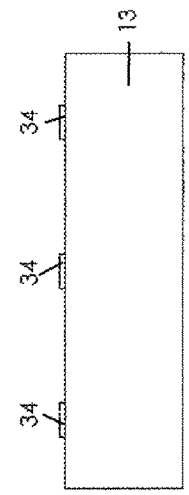
FIG. 44 is a bottom perspective view of the generic lower housing section according to the present invention.
Figure 46:
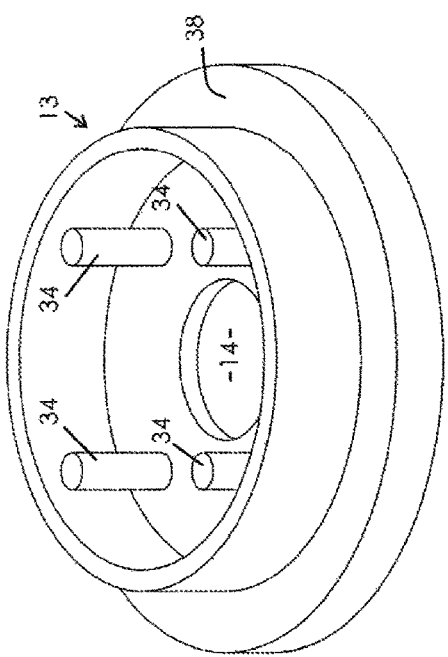
FIG. 46 is a top perspective view of the first alternative embodiment of the generic lower housing section according to the present invention.
Figure 48:
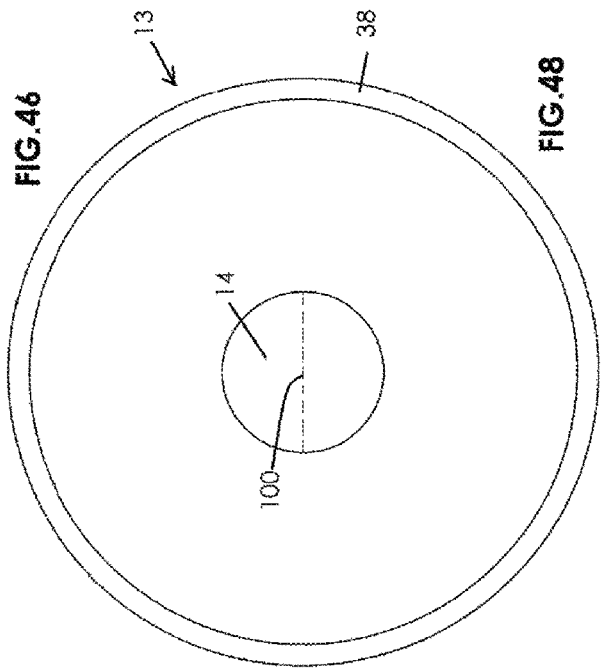
FIG. 48 is a bottom plan view of the first alternative embodiment of the generic lower housing section according to the present invention.
Figure 45:
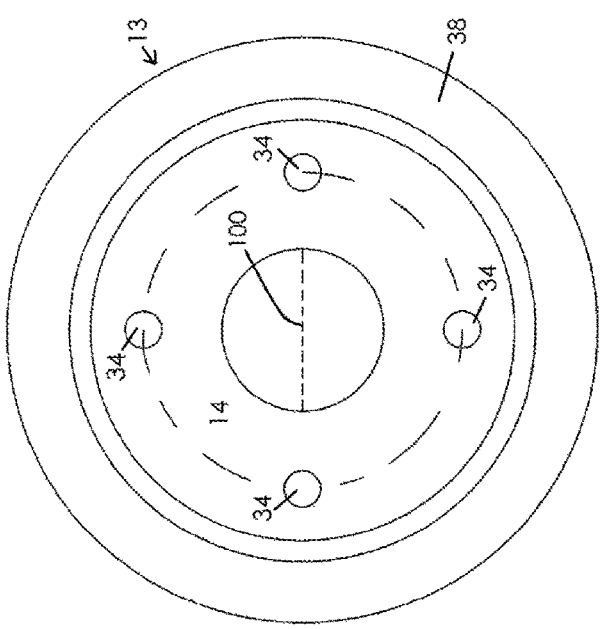
FIG. 45 is a top plan view of a first alternative embodiment of a generic lower housing section according to the present invention.
Figure 47:
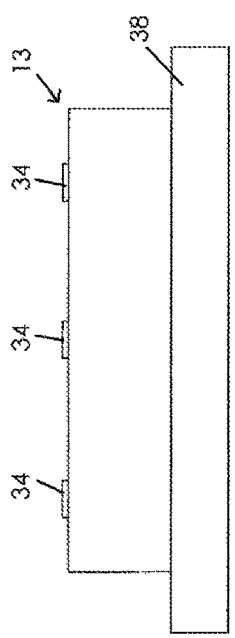
FIG. 47 is a side elevational view of the first alternative embodiment of the generic lower housing section according to the present invention.
Figure 49:
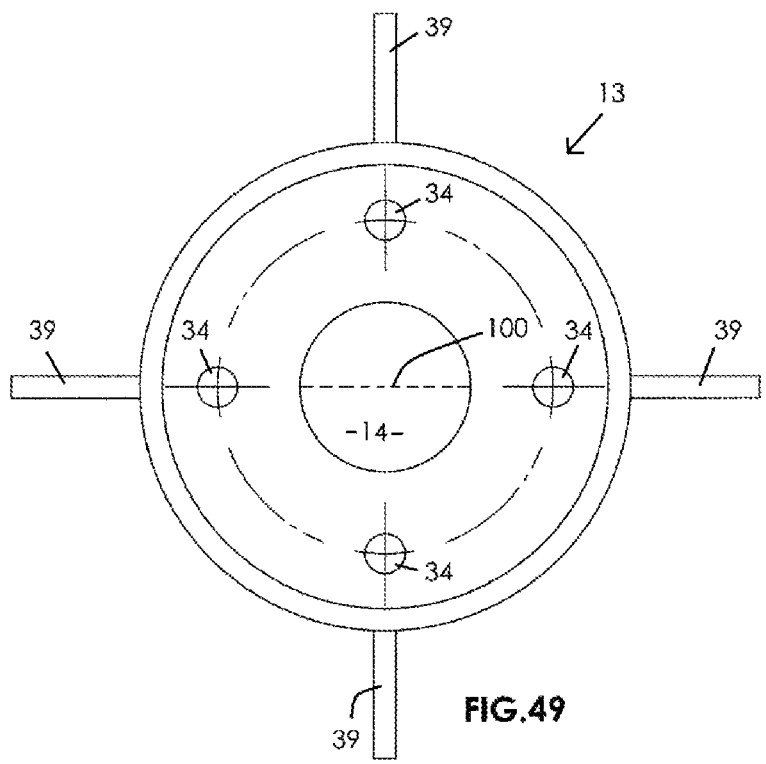
FIG. 49 is a top plan view of a second alternative embodiment of a generic lower housing section according to the present invention.
Figure 50:
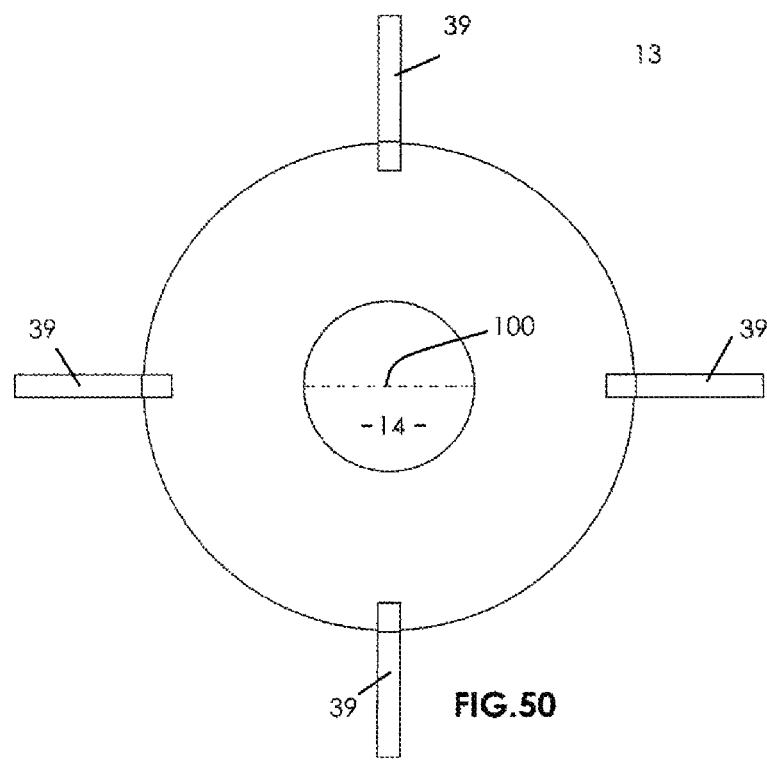
FIG. 50 is a bottom plan view of the second alternative embodiment of the generic lower housing section according to the present invention.
Figure 51:
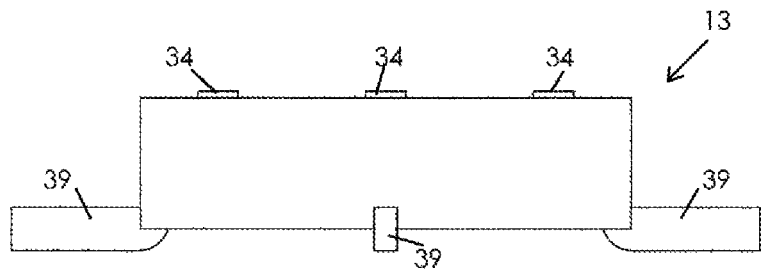
FIG. 51 is a side elevational view of the second alternative embodiment of the generic lower housing section according to the present invention.
Figure 52:
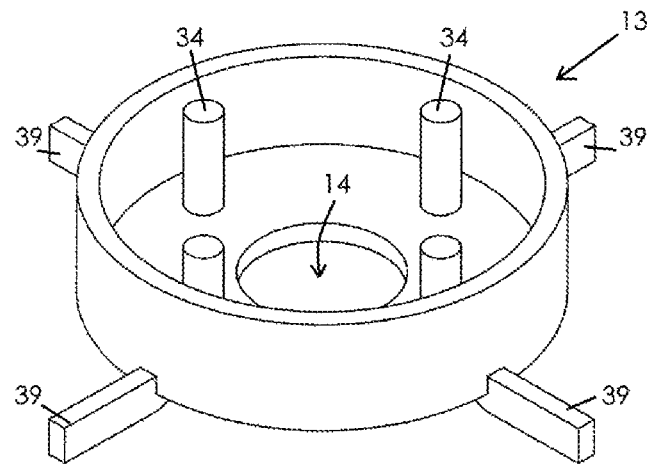
FIG. 52 is a top perspective view of the second alternative embodiment of the generic lower housing section according to the present invention.
Figure 53:
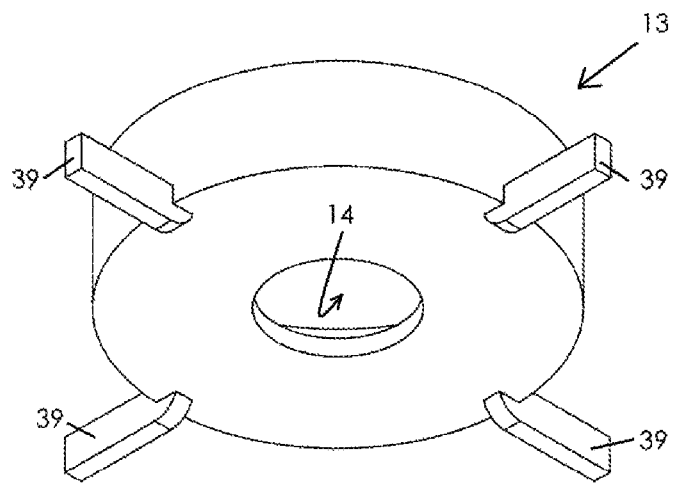
FIG. 53 is a bottom perspective view of the second alternative embodiment of the generic lower housing section according to the present invention.

The lower stem section 21 preferably comprises a lower stem height as at 101 and a lower stem diameter as at 102; the upper section 22 preferably comprises an upper stem height as at 103 and an upper stem diameter as at 104; and the intermediate, collar-receiving stem section 23 preferably comprises an intermediate stem height as at 105 and an intermediate stem diameter as at 106. Referencing FIG. 23A, the reader will there consider that the lower and upper stem diameters 102 and 104 are preferably equal in magnitude while the intermediate stem diameter 106 is preferably lesser in magnitude relative to the lower and upper stem diameters 102 and 104. The circular stem-letting aperture 14 of the lower housing section 13 is dimensioned to receive the lower stem section 21 of the suction cup formation 15 and thus diameter 100 of aperture 24 is preferably greater than diameter(s) 102 (and 104).

The relief valve formation 16 preferably comprises a valve stem as at 25, a valve stop portion as at 26, and a valve upper portion as at 27. The valve stem 25 preferably comprises a valve stem end as at 28, a valve stem height as at 107, a valve stem diameter as at 108, and opposed valve stem grooves as at 29. The opposed valve stem grooves 29 extend from the valve stem end 28 toward the valve stop portion 26 and each preferably comprises a groove length 109 lesser than the valve stem height 107 thereby forming a full diameter valve-sealing portion 30 in adjacency to the valve stop portion 26. The valve stop portion 26 further preferably comprises a stop portion height 110 and a stop portion diameter 111; and the valve upper portion 27 preferably comprises an upper portion height 112 and an upper portion diameter 113. The valve stem 25 is sized and shaped for receipt within the valve-letting passage 24 of the suction cup formation 15.

As indicated, the collar element 17 is preferably and generally C-shaped such that the collar element 17 preferably further comprises an outer collar periphery as at 31, an inner slot portion as at 32, and a collar element thickness as at 114. The outer collar periphery 31 preferably has an outer collar diameter as at 115, and the inner slot portion 32 preferably comprises a substantially uniform inner slot width as at 116 with a radiused inner end as at 33 cooperable with the perimeter of the intermediate, collar-receiving stem section 23. In other words, the inner slot width 116 is dimensioned for accepting the intermediate stem diameter 106 of the intermediate, collar-receiving stem section 23, and the outer collar diameter 115 is preferably greater in magnitude relative to the aperture diameter 100. The collar element thickness 114 is preferably lesser than the intermediate stem height 105 for receipt thereby.

The toy housing 11 is pressable or directable toward the suction cup formation 15 as at arrow 121 such that the upper housing section 12 engages the valve upper portion 27 for driving (a) the valve stop portion 26 into engagement with the upper stem portion 22; (b) the valve-sealing portion 30 into passage-sealing engagement within the valve-letting passage 24. The collar element 17 primarily functions to retain the upper stem section 22 inside the toy housing 11 during the action of pressing or directing the toy housing 11 toward and away from the suction cup formation 15. A primary objective of the moving collar element 17 is that the element 17 helps support movement of the relief valve formation 16 and further ensures that the suction cup formation 15 can be securely retained in connected relation relative to the housing 11 (e.g. a child who may try to pull the suction cup formation 15 from the toy housing 11 and would be structurally prevented from doing so).

The collapsible cup portion 18, being formed from a resilient material, is collapsible against a smooth attachment surface as at 120 for creating a vacuumed chamber 123 at the inner cup surfacing 20. According to well understood physical principles, the vacuumed chamber 123 operates to retain the suction cup ensemble-toy combination 10 upon the smooth attachment surface 120. The toy housing 11 is re-directable away from the suction cup formation 15 as at arrow 122 such that the lower housing section 13 engages the valve upper portion 27 for removing the valve-sealing portion 30 from the valve-letting passage 24 thereby letting air to enter the opposed stem grooves 29 as at arrows 124 for equalizing pressure at the inner cup surfacing 20 and releasing the suction cup ensemble-toy combination 10 from the smooth attachment surface 120.

The reader should note that the dual or laterally opposed groove design of the opposed stem grooves 29 is purposeful because with the preferred low durometer PVC or TPE or Silicone material formation of the suction cup formation 15, the material construction may conform to the groove construction(s) thereby sealing the passage enabled via the grooves 29. Providing a dual groove construction as in opposed stem grooves 29 helps ensure that the suction action of the vacuumed chamber 123 is broken when force is applied as at arrow 122. A primary object of the present invention is to provide a low force removal as at arrow 122 while still providing a strong suction action via the vacuumed chamber 123 when hanging or attaching the suction cup ensemble-toy combination 10 on a vertical smooth support surface 120 as exemplified by a mirror or window or wall.

Figure 54:
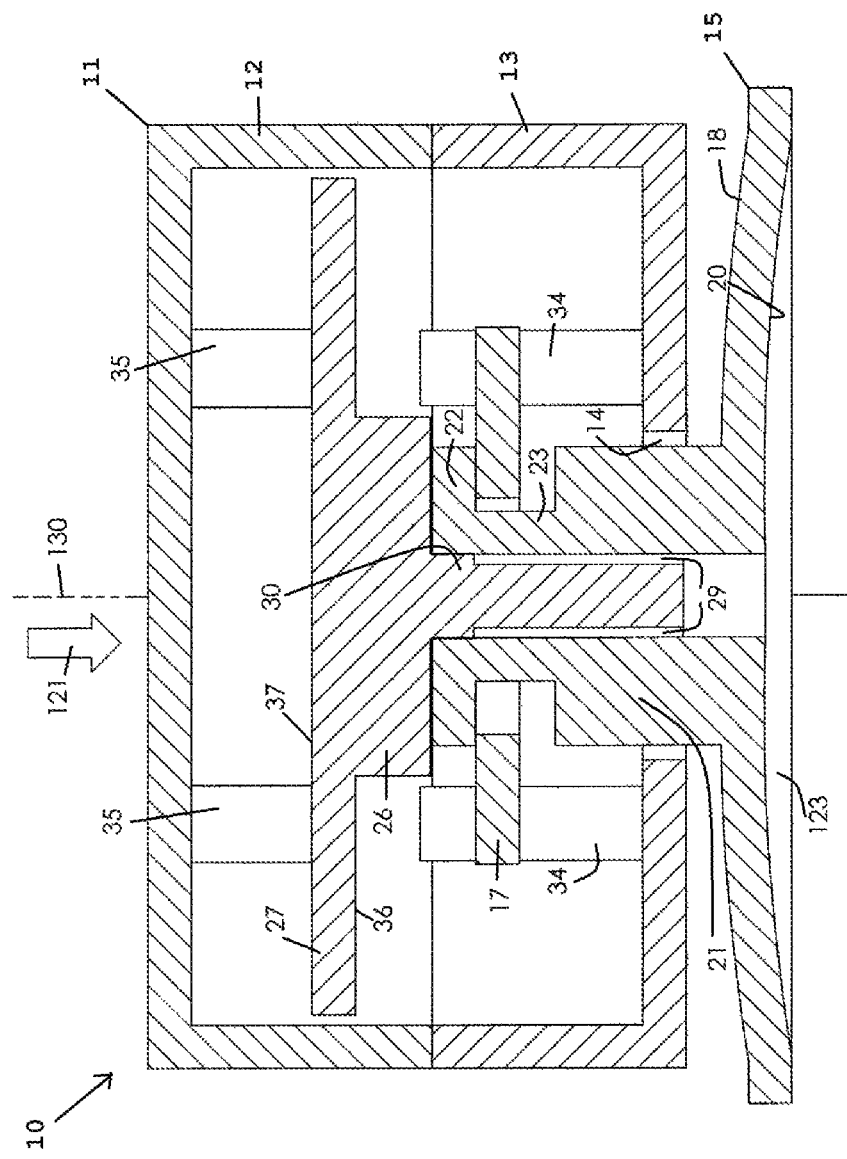
FIG. 54 is an enlarged longitudinal cross-sectional view of the preferred suction cup ensemble-toy combination according to the present invention depicting the preferred suction cup ensemble-toy combination in the collapsed or actuated, vacuum-chamber forming configuration.
Figure 55:
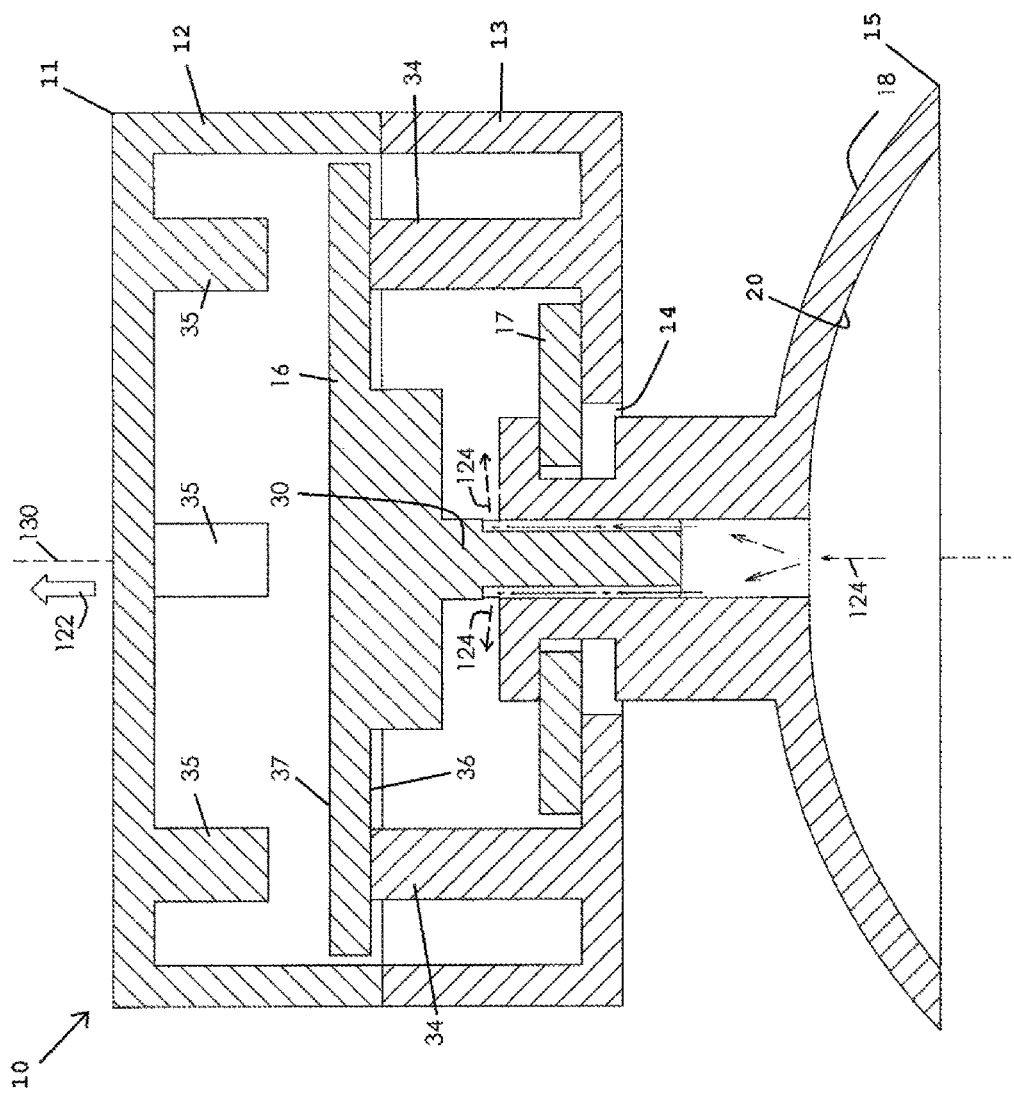
FIG. 55 is an enlarged longitudinal cross-sectional view of the preferred suction cup ensemble-toy combination according to the present invention depicting the preferred suction cup ensemble-toy combination in the relaxed configuration.

In this last regard, the reader will further note that the suction cup ensemble-toy combination 10 according to the present invention further preferably provides the lower housing section 13 with a series of lower housing posts as at 34 that extend toward the upper housing section 12. The series of lower housing posts 34 are preferably arranged in adjacency to the stem-letting aperture 14 in substantially tangential relation to the collar element 17 for post-guiding the collar element 17 during movement as it rides upon the intermediate stem section 23 between the collapsed, actuated, vacuum-creating cup configuration, as generally depicted in FIG. 54 and the relaxed, vacuum-releasing configuration as generally depicted in FIG. 55.

The series of lower housing posts 34 further operate to engage a first side 36 of the valve upper portion 27 for removing the valve-sealing portion 30 from the valve-letting passage 24 when the toy housing 11 is directable away as at arrow 122 from the suction cup formation 15. The series of lower housing posts 34 are preferably arranged in equidistant relation relative to the stem-letting aperture 14 such that the outer collar periphery 31 is substantially tangent to the series of lower housing posts 34 and that together the lower housing posts 34 and collar element 13 maintain axial displacement of the valve stem 25 relative to the valve-letting passage 24.

Similarly, the upper housing section 12 may be preferably outfitted with or comprise a series of upper housing posts as at 35 that extend toward the lower housing section 13. The series of upper housing posts 35 operate to engage a second side 37 of the valve upper portion 27 for driving (a) the valve stop portion 26 into engagement with the upper stem portion 22, and (b) the valve-sealing portion 30 into passage-sealing engagement within the valve-letting passage 24. The series of lower housing posts 34 and the series of upper housing posts 35 are preferably and respectively in axial alignment with one another.

Comparatively referencing FIGS. 45-53 and 56-60, the reader will there further consider that the suction cup ensemble-toy combination 10 according to the present invention may further preferably comprise an outwardly extending support ring 38 integrally formed with the lower housing section 13, or alternatively, a series of outwardly extending support ribs 39. Either the outwardly extending support ring 38 or the series of outwardly extending support ribs 39 basically operate to contact the smooth attachment surface 120 when placed under an ensemble axis (as at axis 130) bending load (e.g. when the suction cup ensemble-toy combination 10 is attached to a vertical smooth attachment surface 120) and enhances support of the suction cup ensemble-toy combination 10 when attached to such a smooth attachment surface 120.

The addition of either the outwardly extending support ring 38 (preferred) or the series of outwardly extending support ribs 39 (alternative) allows the suction cup ensemble-toy combination 10 to retain a firm attachment to the smooth attachment surface 120, yet still enable easy release when directed perpendicular to the smooth attachment surface 120 as at arrow 122. The outwardly extending support ring 38 and support ribs 39 basically prevent excessive leaning since excessive leaning may dislodge the suction cup ensemble-toy combination 10 from the smooth attachment surface 120 by breaking the seal of the vacuumed chamber 123 or equalizing the pressure at the inner cup surfacing 20.

The preferred support ring 38 is believed preferable given its continuously circular periphery enabling the user to mount the suction cup ensemble-toy combination 10 in virtually any direction while the support ribs 39 are best able to prevent excessive leaning when any select support rib 39 is preferably positioned in a downward direction relative to the toy housing 11 for preventing the leaning under the weight of the apparatus or ensemble 10 as at downwardly directed force 125.

An alternative embodiment of the suction cup ensemble according to the present invention is generally depicted and referenced at 210 in FIGS. 61-86. The primary structural difference between embodiment(s) 10 and embodiment(s) 210 is the housing structure 211 and the elimination of optional collar element 17. Embodiment 210 comprises suction cup formation as at 15 and relief valve formation as at 16 substantially as described hereinabove. The housing structure 211 preferably comprises an upper housing portion 212, an upper valve-letting portion or aperture 213, an upper valve-holding formation 214 extending in parallel to the upper housing portion 212, and a stem-letting aperture as at 14.

The upper valve-letting portion or aperture 213 accepts the lower, smaller diameter section 26 and the upper, larger diameter section 27 is sandwiched snugly between the upper housing portion 212 and the upper valve-holding formation 214 as generally and comparatively depicted in FIGS. 83 and 84. Thus, when the housing structure 211 is axially displaced relative to the suction cup formation 15 via the letting aperture 14, the relief valve structure 16 moves in unison with the housing structure 211 for either collapsing the cup portion 18 for adherence to a support surface 120 or removal therefrom.

The reader will further note that the valve-letting aperture 14 of the housing structure 211 of embodiment 210 comprises a diameter for receiving the intermediate stem section 23 of the relief valve formation 16. Axial displacements of the housing structure 211 relative to the suction cup formation 15 are thus limited by the height 105 of the intermediate stem section 23. Further, when referencing FIGS. 85 and 86, the reader will further consider that the embodiment 210 may be optionally outfitted with either support ring 38 or support ribs 39 for preventing any over-bending action when mounted on a vertical support surface 120 substantially as described hereinabove in connection with embodiment(s) 10.

While the invention has been disclosed with reference to certain preferred and alternative embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the claims appended to these specifications.

For example, it is contemplated that the present invention may be regarded more simply as a consumer product or toy suction cup ensemble as otherwise depicted and referenced at embodiments 10 and 210. The toy housing may preferably be formed to provide any fanciful or ornamental appearance such as characters or objects amusing to children. The cylindrical housings 11 and 211 illustrated throughout the drawings submitted in support of these specifications have been so illustrated merely to provide the reader with an easier understanding of the subject invention. The suction cup ensemble or embodiment 10 according to the present invention may thus be said to essentially and preferably comprise a housing as at 11, a suction cup formation as at 15, a relief valve formation as at 16, and a collar element as at 17.

The housing 11 essentially has a stem-letting aperture as at 14 while the suction cup formation 15 is believed to essentially comprise a collapsible cup portion as at 18, a stem portion as at 19, and a valve-letting passage as at 24. The stem portion 19 preferably comprises a collar-receiving section as at intermediate stem section 23 having a collar-receiving girth (e.g. as dependent upon diameter 106), and the valve-letting passage 24 extends through the stem portion 19 to the collapsible cup portion 18. The stem-letting aperture 14 of the housing 11 receives the stem portion 19.

The relief valve formation 16 essentially comprises a valve stem as at 25 and a valve upper portion (e.g. a combination of elements 26 and 27). The valve stem 25 essentially comprises opposed valve stem grooves as at 29, which opposed valve stem grooves 29 extend toward the valve upper portion from a valve stem end (e.g. feature 28) of the valve stem 25 and each comprises a groove length lesser in magnitude relative to the valve stem 25 thereby forming a valve-sealing portion as at 30 in adjacency to the valve upper portion. The valve stem 25 is receivable in the valve-letting passage 24.

The collar element as at 17 essentially comprises an outer collar periphery 31 having an overall collar width and an inner slot portion as at 32, the latter of which accepts the collar-receiving section of the stem portion 19 of the suction cup formation 15. The housing 11 is directable toward the suction cup formation 15 for driving the valve-sealing portion 30 into the valve-letting passage 24, and the collar element 17 is essentially wider than the stem-letting aperture 14 for retaining the stem portion 19 inside the housing 11.

The collapsible cup portion 18 is collapsible against a smooth attachment surface as at 120 for creating a vacuumed chamber as at 123, which vacuum chamber 123 basically operates to retain the suction cup ensemble 10 upon the smooth attachment surface according to well-known physical principles. The housing 11 is re-directable away from the suction cup formation 15 for removing the valve-sealing portion 30 from the valve-letting passage 24 thereby letting air to enter the opposed stem grooves 29 for equalizing pressure at the collapsible cup formation 18 and releasing the suction cup ensemble 10 from the smooth attachment surface 120.

The housing 11 may optionally comprise a series of lower housing posts as at 34 that extend toward an upper housing section of the housing 11. The series of lower housing posts 34 are preferably arranged in adjacency to the stem-letting aperture 14 and engage a first side as at 36 of the valve upper portion for removing the valve-sealing portion 30 from the valve-letting passage 24 when the housing 11 is directed away from the suction cup formation 15.

The series of lower housing posts 34 are preferably arranged in equidistant relation relative to the stem-letting aperture 14. The collar element 17 is preferably positioned centrally relative to the series of lower housing posts 34 such that the lower housing posts 34 and collar element 17 together operate to maintain axial displacement of the valve stem 25 relative to the valve-letting passage 24 along ensemble axis 130. The upper housing section as at 12 may preferably also comprise a series of upper housing posts as at 35 that extend toward the lower housing posts 34 for engaging a second side as at 37 of the valve upper portion for driving the valve-sealing portion 30 into the valve-letting passage 24.

The housing 11 of the suction cup ensemble 10 according to the present invention may further optionally include either an outwardly extending support mechanism exemplified by either support ring as at 38 or a series of outwardly extending support ribs as at 39. The outwardly extending support mechanism, as variously exemplified by support ring 38 and support ribs 39, operates to contact the smooth attachment surface 120 during leaning events and thus function to enhance support of the suction cup ensemble 10 when attached to the smooth attachment surface 120 particularly when said surface 120 is in a vertical orientation.

Alternative embodiment 210 according to the present invention provides housing structure 211 and eliminates the optional collar element 17. Embodiment 210 comprises suction cup formation as at 15 and relief valve formation as at 16 substantially as described in connection with embodiment 10. The housing structure 211 preferably comprises an upper housing portion 212, an upper valve-letting portion or aperture 213, an upper valve-holding formation 214 extending in parallel to the upper housing portion 212, and a stem-letting aperture as at 14.

The upper valve-letting portion or aperture 213 accepts the lower, smaller diameter section 26 and the upper, larger diameter section 27 is sandwiched snugly between the upper housing portion 212 and the upper valve-holding formation 214. When the housing structure 211 is axially displaced relative to the suction cup formation 15 via the letting aperture 14, the relief valve structure 16 moves in unison with the housing structure 211 for either collapsing the cup portion 18 for adherence to a support surface 120 or removal therefrom.

The valve-letting aperture 14 of the housing structure 211 of embodiment 210 comprises a diameter for receiving the intermediate stem section 23 of the relief valve formation 16. Axial displacements of the housing structure 211 relative to the suction cup formation 15 are limited by the height 105 of the intermediate stem section 23. Embodiment 210 may be optionally outfitted with either support ring 38 or support ribs 39 for preventing any over-bending action when mounted on a vertical support surface 120 substantially as described hereinabove in connection with embodiment(s) 10.

What is claimed is:

1. A consumer product suction cup ensemble, the consumer product suction cup ensemble comprising:
    a housing, the housing having an upper housing section and a lower housing section, the lower housing section comprising a stem-letting aperture, the stem-letting aperture having an aperture diameter;
    a suction cup formation, the suction cup formation comprising a collapsible cup portion and a stem portion, the collapsible cup portion comprising inner cup surfacing, the stem portion comprising a lower stem section, an upper stem section, an intermediate stem section intermediate the lower and upper stem sections, and a valve-letting passage, the lower stem section comprising a lower stem height and a lower stem diameter, the upper section comprising an upper stem height and an upper stem diameter, the intermediate stem section comprising an intermediate stem height and an intermediate stem diameter, the lower and upper stem diameters being equal in magnitude, the intermediate stem diameter being lesser in magnitude relative to the lower and upper stem diameters, the stem-letting aperture for receiving the lower stem section;
    a relief valve formation, the relief valve formation comprising a valve stem, a valve stop portion, and a valve upper portion, the valve stem comprising a valve stem end, a valve stem height, a valve stem diameter, and opposed valve stem grooves, the opposed valve stem grooves extending from the valve stem end toward the valve stop portion and each comprising a groove length lesser than the valve stem height thereby forming a valve-sealing portion in adjacency to the valve stop portion, the valve stop portion comprising a stop portion height and a stop portion diameter, the valve upper portion comprising an upper portion height and an upper portion diameter, the valve stem being receivable in the valve-letting passage; and
    a C-shaped collar element, the C-shaped collar element comprising an outer collar periphery, an inner slot portion, and a collar element thickness, the outer collar periphery having an outer collar diameter, the inner slot portion comprising an inner slot width, the inner slot width for accepting the intermediate stem diameter of the intermediate stem section, the outer collar diameter being greater than the aperture diameter, the collar element thickness being lesser than the intermediate stem height;
    the housing being directable toward the suction cup formation such that the upper housing section engages the valve upper portion for driving the valve stop portion into engagement with the upper stem portion and the valve-sealing portion into sealing engagement within the valve-letting passage, the collar element for retaining the upper stem section inside the housing, the collapsible cup portion being collapsible against a smooth attachment surface for creating a vacuumed chamber at the inner cup surfacing, the vacuumed chamber for retaining the consumer product suction cup ensemble upon the smooth attachment surface, the housing being directable away from the suction cup formation such that the lower housing section engages the valve upper portion for removing the valve-sealing portion from the valve-letting passage thereby letting air to enter the opposed stem grooves for equalizing pressure at the inner cup surfacing and releasing the consumer product suction cup ensemble from the smooth attachment surface.

2. The consumer product suction cup ensemble of claim 1 wherein the lower housing section comprises a series of lower housing posts extending toward the upper housing section, the series of lower housing posts being arranged in adjacency to the stem-letting aperture, the series of lower housing posts for engaging a first side of the valve upper portion for removing the valve-sealing portion from the valve-letting passage when the housing is directable away from the suction cup formation.

3. The consumer product suction cup ensemble of claim 2 wherein the series of lower housing posts are arranged in equidistant relation relative to the stem-letting aperture, the outer collar periphery being substantially tangent to the series of lower housing posts, the lower housing posts and collar element together for maintaining axial displacement of the valve stem relative to the valve-letting passage.

4. The consumer product suction cup ensemble of claim 3 wherein the upper housing section comprises a series of upper housing posts extending toward the lower housing section, the series of upper housing posts for engaging a second side of the valve upper portion for driving the valve stop portion into engagement with the upper stem portion and the valve-sealing portion into sealing engagement within the valve-letting passage.

5. The consumer product suction cup ensemble of claim 4 wherein the series of lower and upper housing posts are in axial alignment with one another.

6. A consumer product suction cup ensemble, the consumer product suction cup ensemble comprising:
    a housing, the housing having a stem-letting aperture;
    a suction cup formation, the suction cup formation comprising a collapsible cup portion, a stem portion, and a valve-letting passage, the valve-letting passage extending through the stem portion to the collapsible cup portion, the stem-letting aperture for receiving the stem portion; and
    a relief valve formation, the relief valve formation comprising a valve stem and a valve upper portion, the valve stem comprising a valve stem end and opposed valve stem grooves, the opposed valve stem grooves extending from the valve stem end toward the valve upper portion and each comprising a groove length lesser in magnitude relative to the valve stem thereby forming a valve-sealing portion in adjacency to the valve upper portion, the valve stem being receivable in the valve-letting passage;

the housing being directable toward the suction cup formation for driving the relief valve formation into engagement with the stem portion and the valve-sealing portion into sealing engagement with the valve-letting passage, the collapsible cup portion being collapsible against a smooth attachment surface for creating a vacuumed chamber at the collapsible cup portion, the vacuumed chamber for retaining the consumer product suction cup ensemble upon the smooth attachment surface, the housing being directable away from the suction cup formation for re-engaging the valve upper portion and removing the valve-sealing portion from engagement with the valve-letting passage thereby letting air to enter the opposed stem grooves for equalizing pressure at the collapsible cup formation for releasing the consumer product suction cup ensemble from the smooth attachment surface.

7. The consumer product suction cup ensemble of claim 6 further comprising:

a collar element, the collar element comprising an outer collar periphery and an inner slot portion, the inner slot portion comprising an inner slot width, the inner slot width for accepting an intermediate stem section, the collar element being wider than the stem-letting aperture for retaining an upper stem section inside the housing; and wherein the housing comprises a series of lower housing posts extending toward an upper housing section, the series of lower housing posts being arranged in adjacency to the stem-letting aperture, the series of lower housing posts for engaging a first side of the valve upper portion for removing the valve-sealing portion from engagement with the valve-letting passage when the housing is directed away from the suction cup formation.

8. The consumer product suction cup ensemble of claim 7 wherein the series of lower housing posts are arranged in equidistant relation relative to the stem-letting aperture, the collar element being centralized relative to the series of lower housing posts, the lower housing posts and collar element together for maintaining axial displacement of the valve stem relative to the valve-letting passage.

9. The consumer product suction cup ensemble of claim 8 wherein the upper housing section comprises a series of upper housing posts extending toward a lower housing section, the series of upper housing posts for engaging a second side of the valve upper portion for driving the valve upper portion into engagement with the upper stem portion and the valve-sealing portion into sealing engagement with the valve-letting passage.

10. The suction cup ensemble-toy combination of claim 9 wherein the series of lower and upper housing posts are respectively and axially aligned.

11. The consumer product suction cup ensemble of claim 6 wherein the housing comprises an upper housing portion, an upper valve-letting aperture, and an upper valve-holding formation extending in parallel to the upper housing portion, the upper valve-letting portion aperture for accepting a lower section of the valve upper portion, an upper section of the valve upper portion being sandwiched between the upper housing portion and the upper valve-holding formation, the relief valve structure moving in unison with the housing for either collapsing the cup portion for adherence to the smooth support surface or removal therefrom when the housing is axially displaced relative to the suction cup formation via the stem-letting aperture.

12. A suction cup ensemble, the suction cup ensemble comprising:

a housing, the housing having a stem-letting aperture;

a suction cup formation, the suction cup formation comprising a collapsible cup portion, a stem portion, and a valve-letting passage, the valve-letting passage extending through the stem portion to the collapsible cup portion, the stem-letting aperture for receiving the stem portion;

a relief valve formation, the relief formation comprising a valve stem and a valve upper portion, the valve stem comprising opposed valve stem grooves, the opposed valve stem grooves extending toward the valve upper portion from a valve stem end and each comprising a groove length lesser in magnitude relative to the valve stem thereby forming a valve-sealing portion in adjacency to the valve upper portion, the valve stem being receivable in the valve-letting passage;

the housing being directable toward the suction cup formation for driving the valve-sealing portion into sealing engagement with the valve-letting passage, the cup portion being collapsible against a smooth attachment surface for creating a vacuumed chamber at the collapsible cup portion, the vacuumed chamber for retaining the suction cup ensemble upon the smooth attachment surface, the housing being directable away from the suction cup formation for removing the valve-sealing portion from sealed engagement with the valve-letting passage thereby letting air to enter the opposed stem grooves for equalizing pressure at the collapsible cup formation and releasing the suction cup ensemble from the smooth attachment surface.

13. The suction cup ensemble of claim 12 comprising a collar element and wherein the stem portion comprises a collar-receiving section, the collar element comprising an outer collar periphery and an inner slot portion, the inner slot portion for accepting the collar-receiving section, the housing further comprising a series of lower housing posts extending toward an upper housing section, the series of lower housing posts being arranged in adjacency to the stem-letting aperture, the series of lower housing posts for engaging a first side of the valve upper portion for removing the valve-sealing portion from sealed engagement with the valve-letting passage when the housing is directed away from the suction cup formation.

14. The suction cup ensemble of claim 13 wherein the series of lower housing posts are arranged in equidistant relation relative to the stem-letting aperture, the collar element being centralized relative to the series of lower housing posts, the lower housing posts and collar element together for maintaining axial displacement of the valve stem relative to the valve-letting passage.

15. The suction cup ensemble of claim 14 wherein the upper housing section comprises a series of upper housing posts extending toward the lower housing posts, the series of upper housing posts for engaging a second side of the valve upper portion for driving the valve-sealing portion into sealing engagement with the valve-letting passage.

16. The suction cup ensemble of claim 12 wherein the housing comprises an upper housing portion, an upper valve-letting aperture, and an upper valve-holding formation, the upper valve-letting portion aperture for accepting a lower section of the valve upper portion, an upper section of the valve upper portion being sandwiched between the upper housing portion and the upper valve-holding formation, the relief valve structure moving in unison with the housing for either collapsing the cup portion for adherence to the smooth support surface or removal therefrom when the housing is axially displaced relative to the suction cup formation.

17. The consumer product suction cup ensemble of claim 7 wherein the stem portion comprises a lower stem section, an upper stem section, and an intermediate stem section intermediate the lower and upper stem sections, the lower stem section comprising a lower stem height and a lower stem diameter, the upper section comprising an upper stem height and an upper stem diameter, the intermediate stem section comprising an intermediate stem height and an intermediate stem diameter, the lower and upper stem diameters being equal in magnitude, the intermediate stem diameter being lesser in magnitude relative to the lower and upper stem diameters.

18. The consumer product suction cup ensemble of claim 17 wherein the collar element comprises a collar element thickness, the collar element thickness being lesser than the intermediate stem height, the collar element for retaining the upper stem section inside the housing.

19. The suction cup ensemble of claim 13 wherein the stem portion comprises a lower stem section, an upper stem section, and an intermediate stem section intermediate the lower and upper stem sections, the lower stem section comprising a lower stem height and a lower stem diameter, the upper section comprising an upper stem height and an upper stem diameter, the intermediate stem section comprising an intermediate stem height and an intermediate stem diameter, the lower and upper stem diameters being equal in magnitude, the intermediate stem diameter being lesser in magnitude relative to the lower and upper stem diameters.

20. The consumer product suction cup ensemble of claim 19 wherein the collar element comprises a collar element thickness, the collar element thickness being lesser than the intermediate stem height, the collar element for retaining the upper stem section inside the housing.

* * * * *